Inventor
Paul H. Dixon
By his Attorney

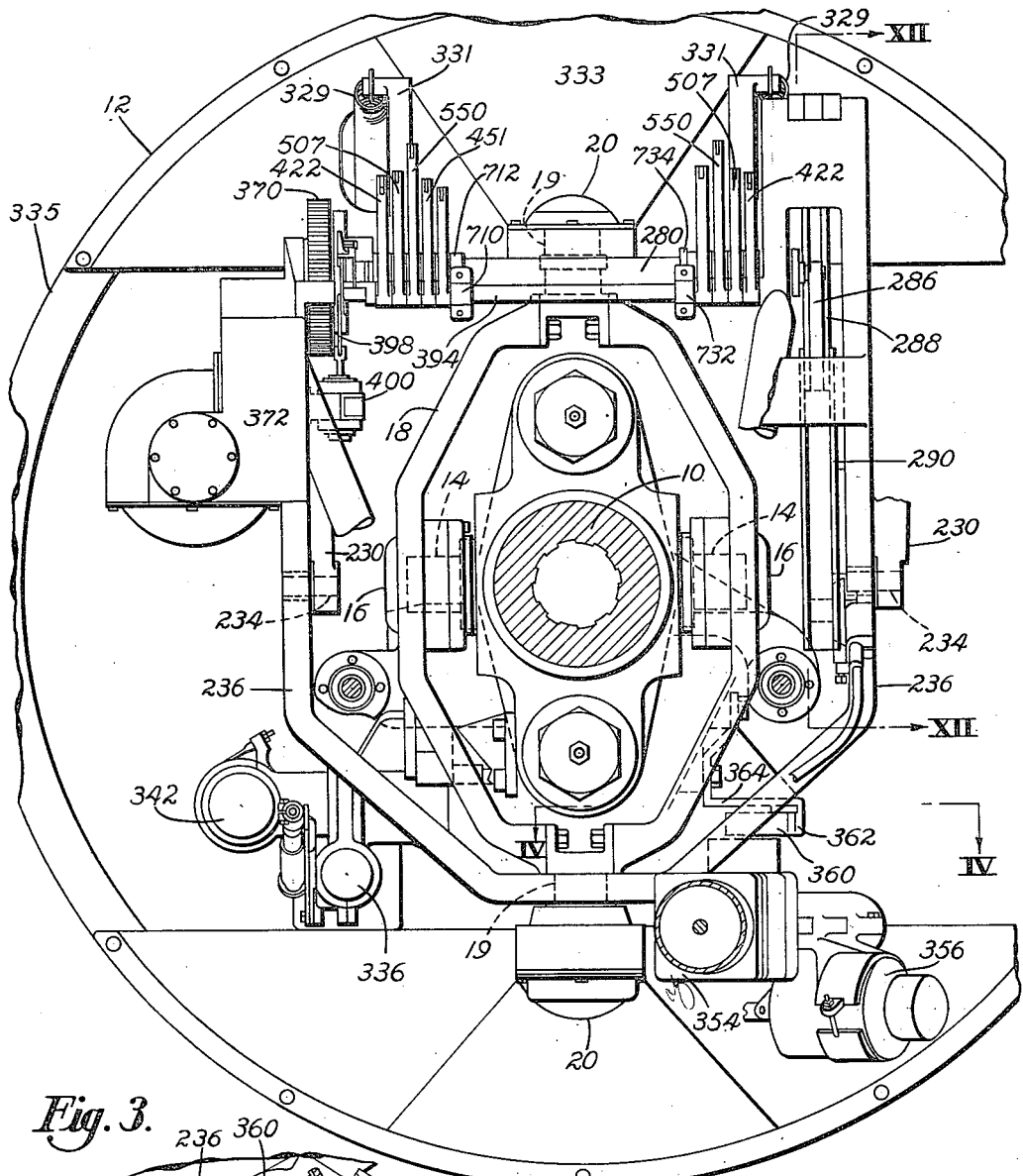
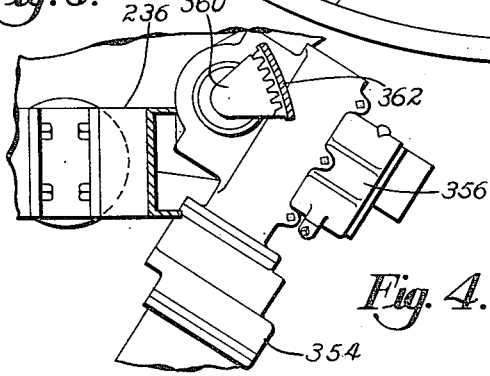

June 3, 1952   P. H. DIXON   2,598,766
GUN LOADING MECHANISM
Filed April 6, 1948   17 Sheets-Sheet 4

Inventor
Paul H. Dixon
By his Attorney

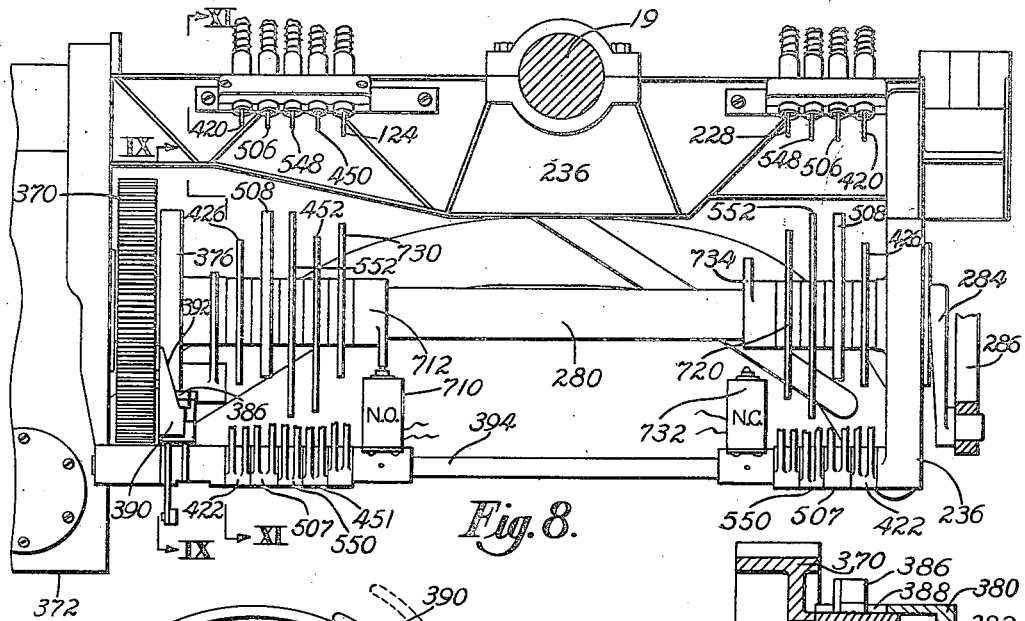
Fig. 8.
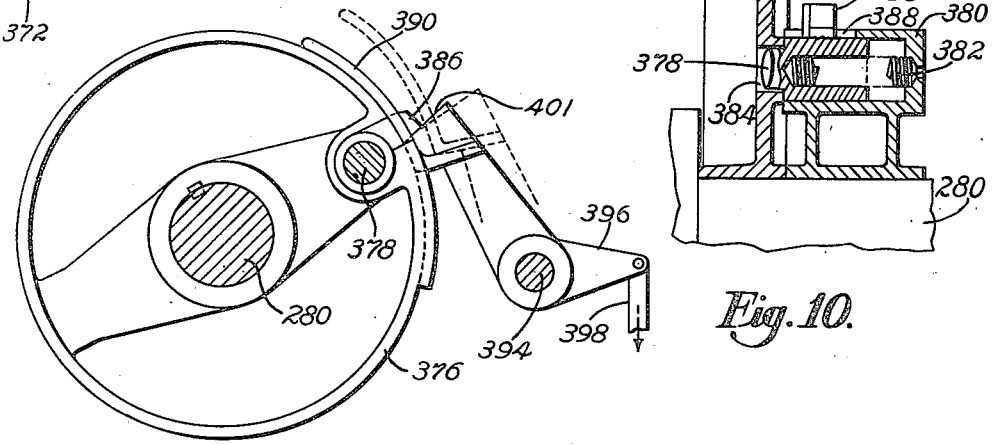
Fig. 9.
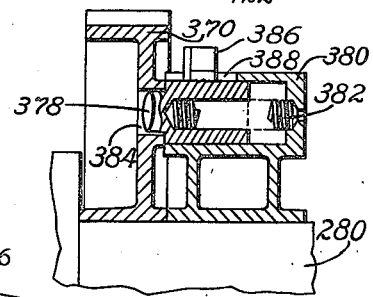
Fig. 10.
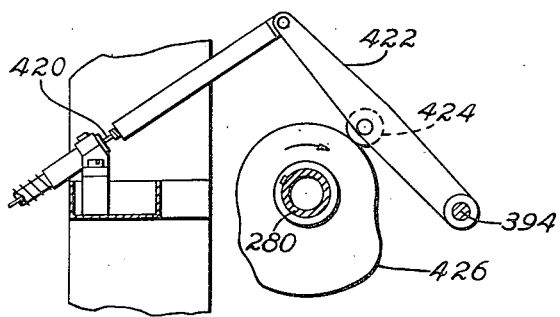
Fig. 11.
Inventor
Paul H. Dixon
By his Attorney Inventor
Paul H. Dixon
By his Attorney

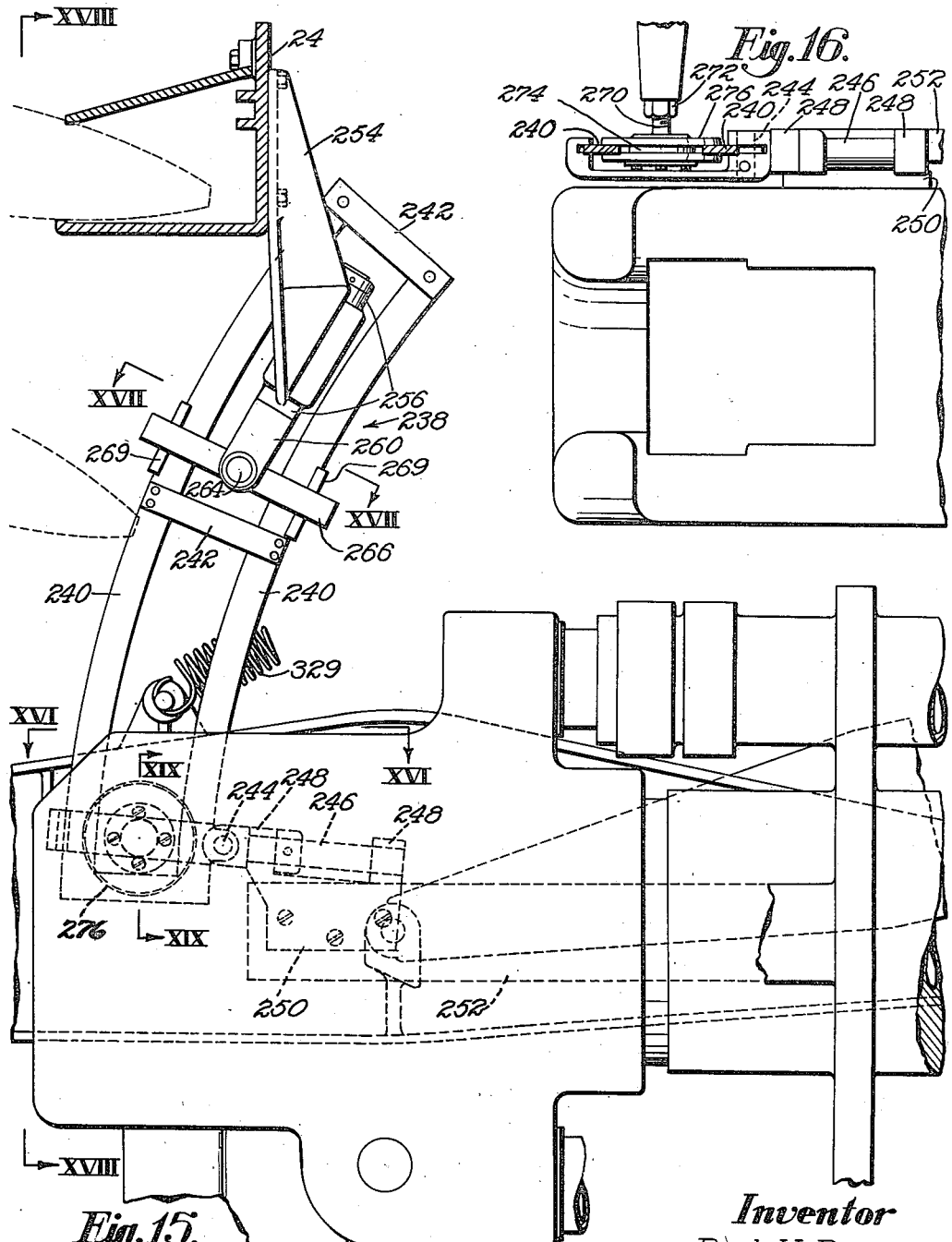

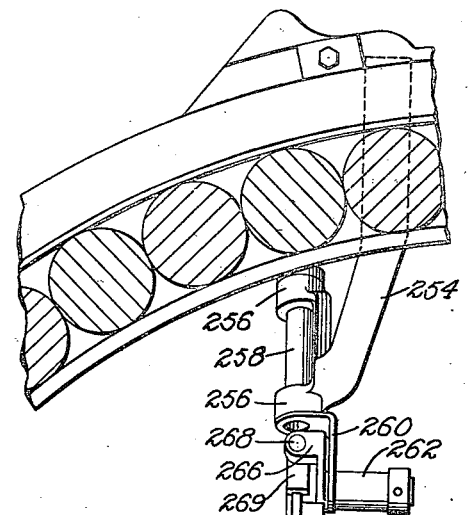
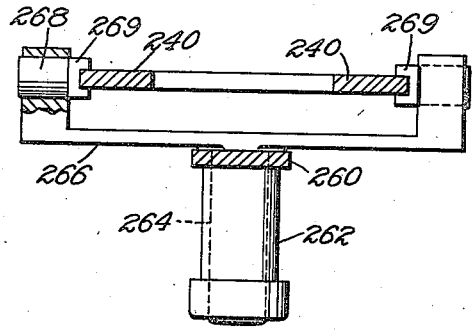
Fig. 17.
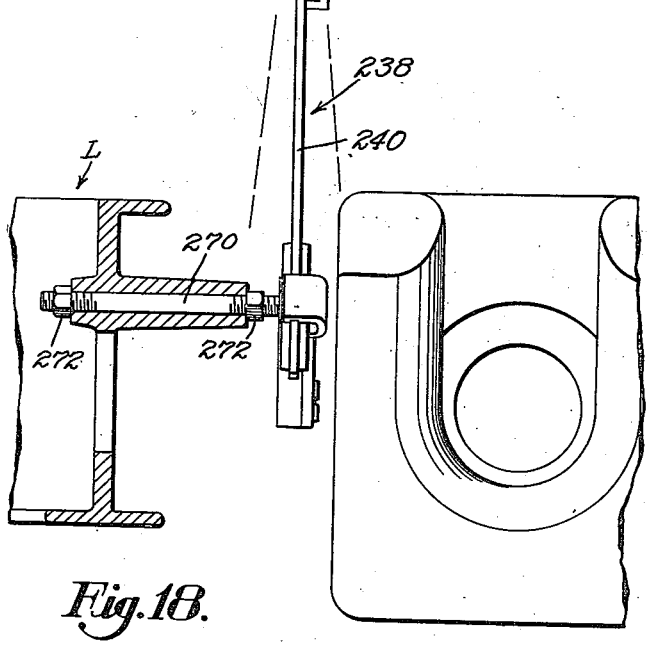
Fig. 18.
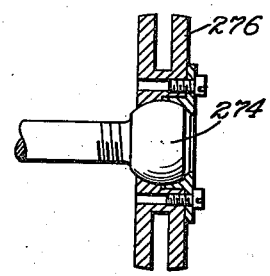
Fig. 19.
Inventor
Paul H. Dixon
By his Attorney June 3, 1952  P. H. DIXON  2,598,766
GUN LOADING MECHANISM
Filed April 6, 1948  17 Sheets-Sheet 9
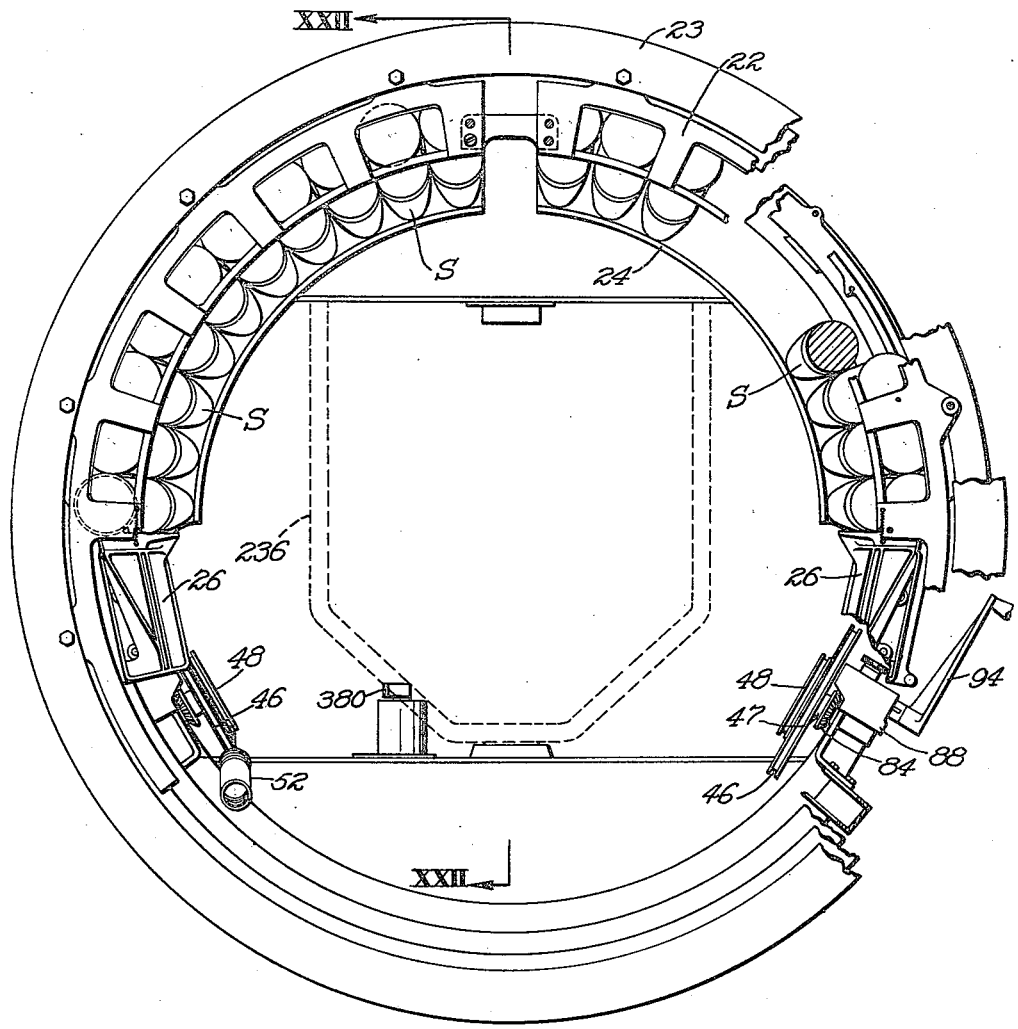
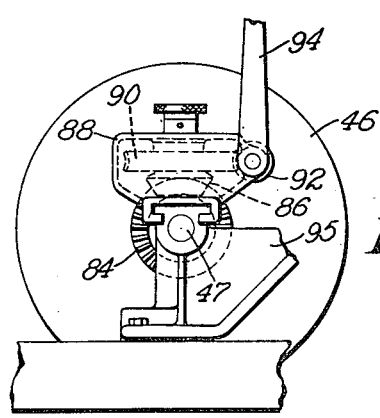
*Fig.20.*
*Fig.21.*
Inventor
Paul H. Dixon
By his Attorney June 3, 1952 P. H. DIXON 2,598,766
GUN LOADING MECHANISM
Filed April 6, 1948 17 Sheets-Sheet 10

Inventor
Paul H. Dixon
By his Attorney

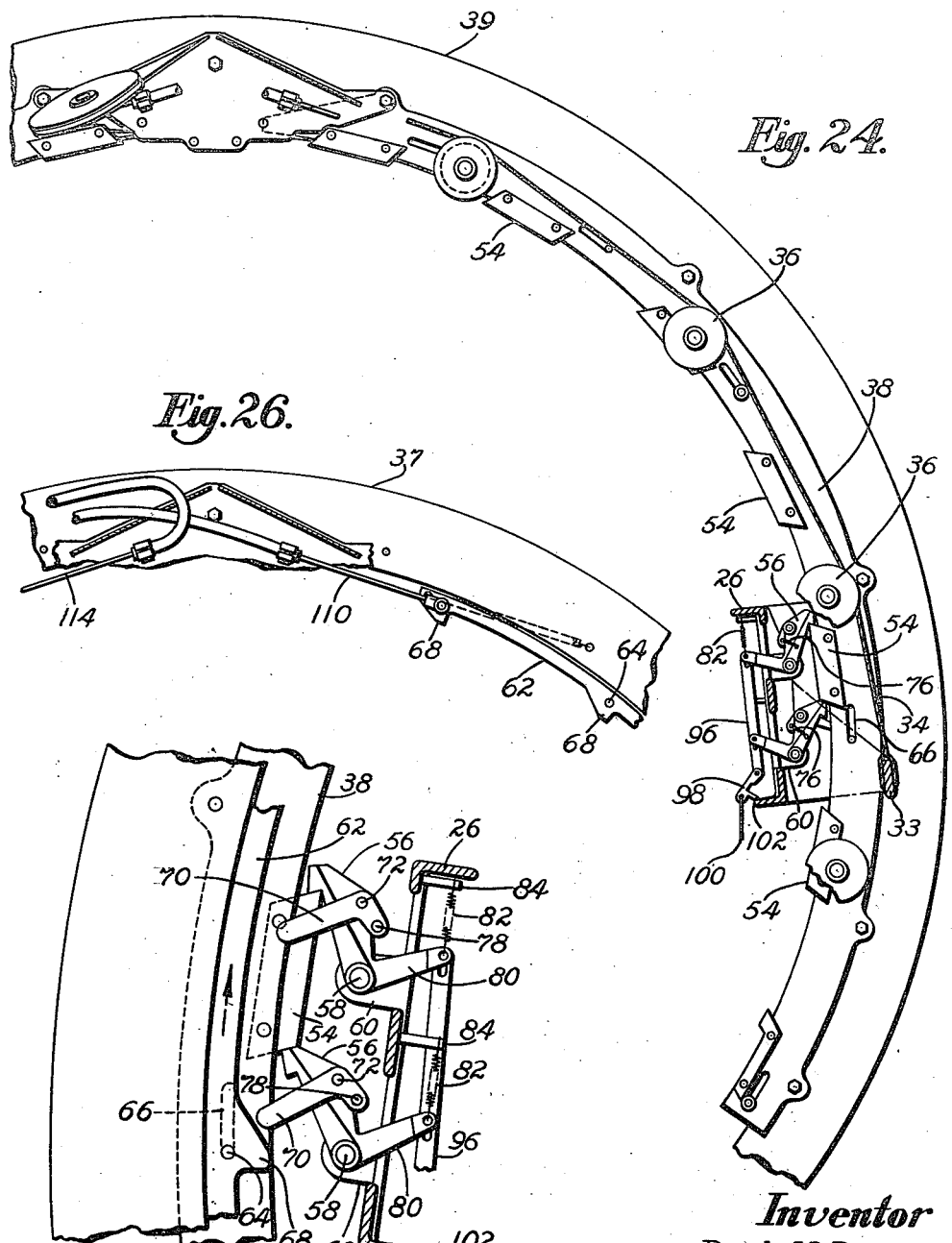

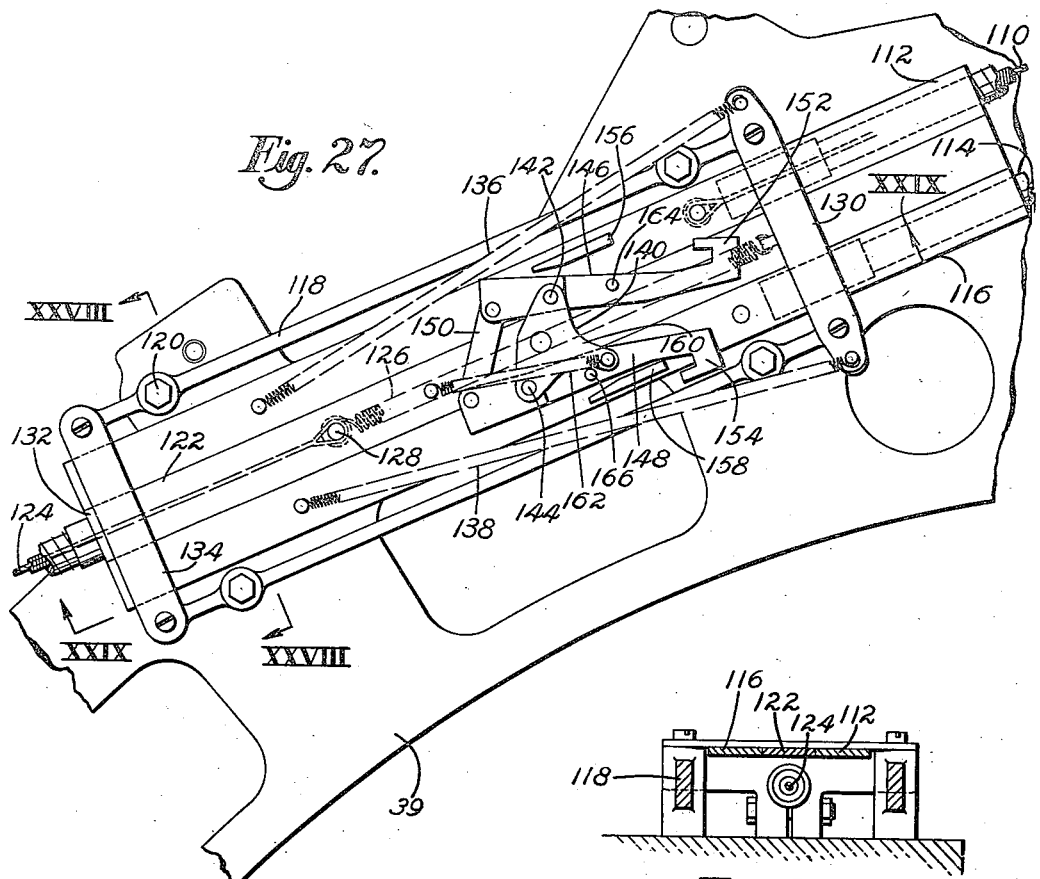
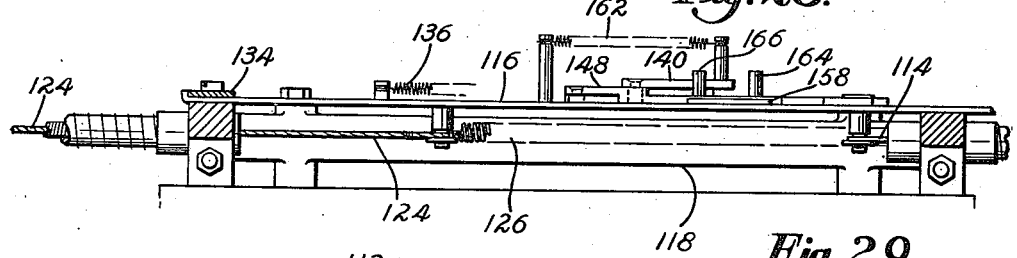
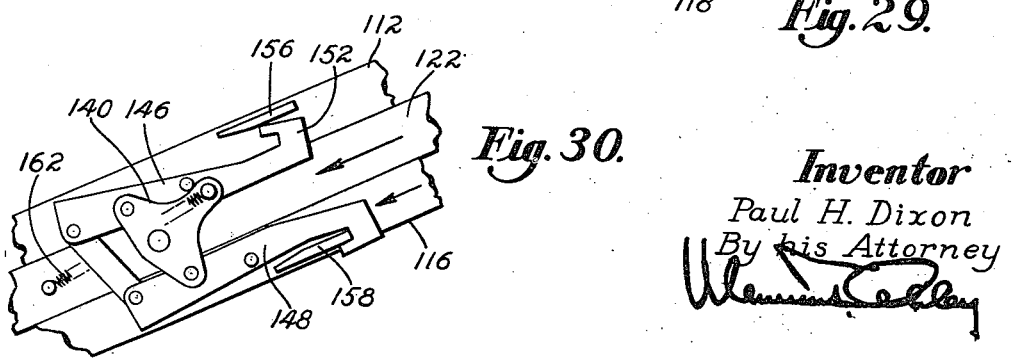
Inventor
Paul H. Dixon
By his Attorney

June 3, 1952  P. H. DIXON  2,598,766
GUN LOADING MECHANISM
Filed April 6, 1948  17 Sheets-Sheet 13

Inventor
Paul H. Dixon
By his Attorney

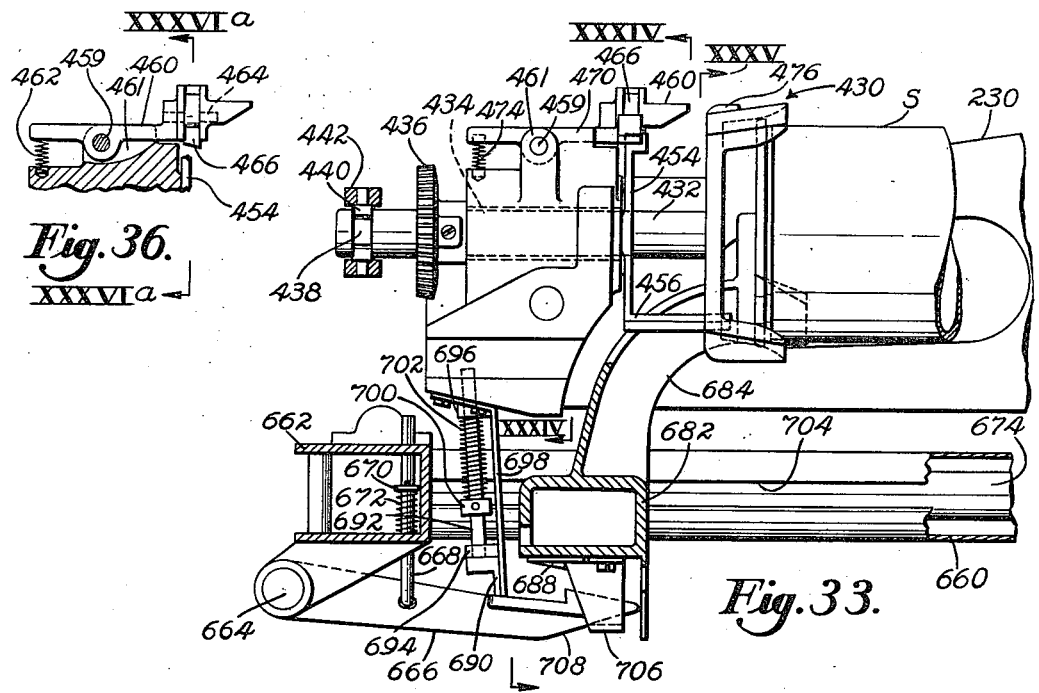
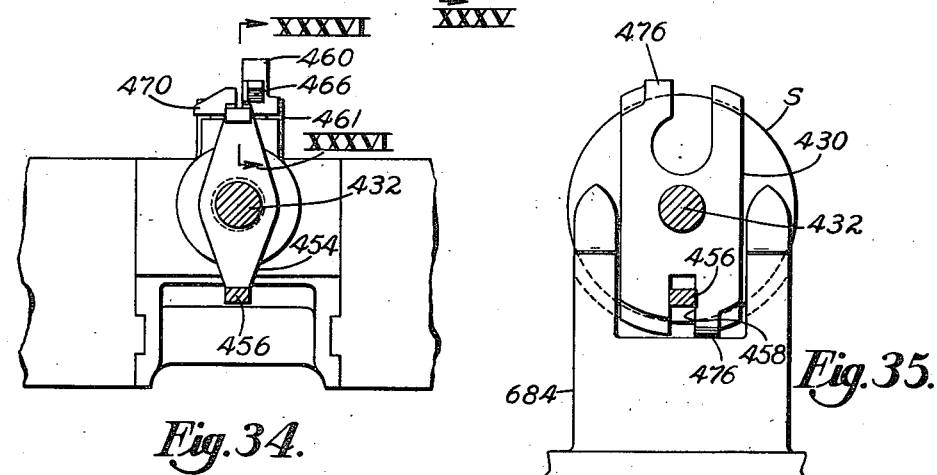
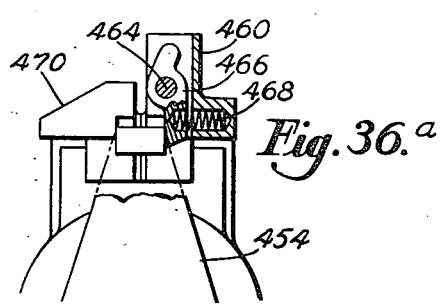
Inventor
Paul H. Dixon
By his Attorney

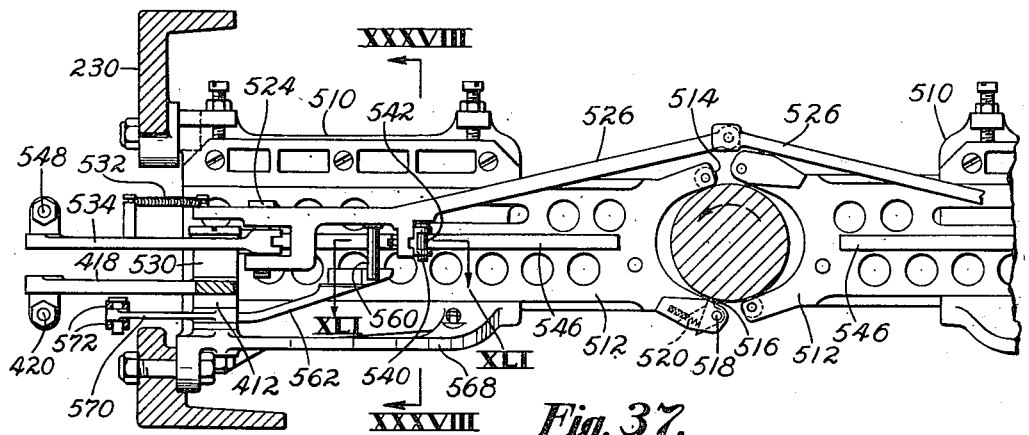
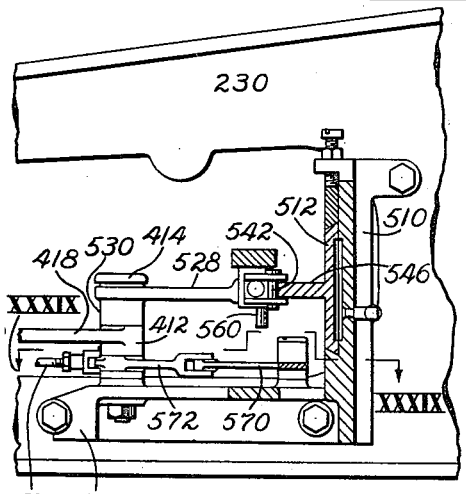
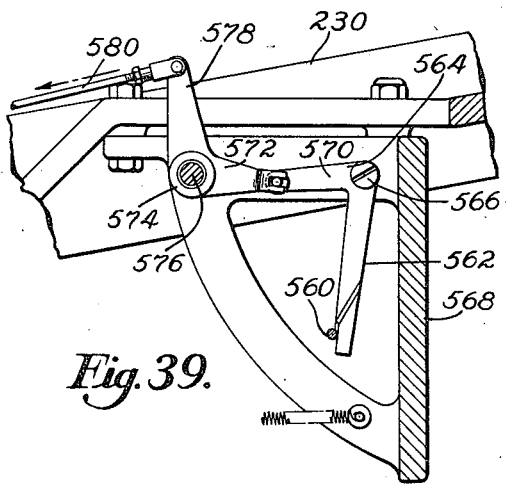
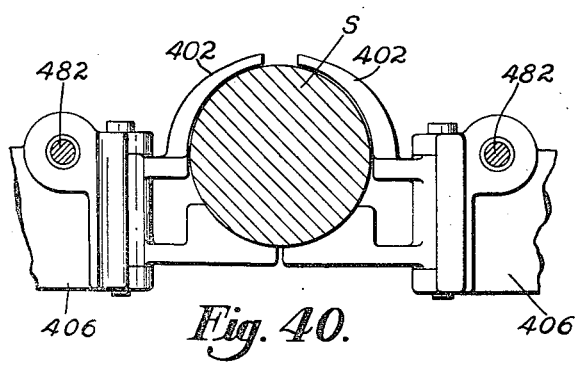
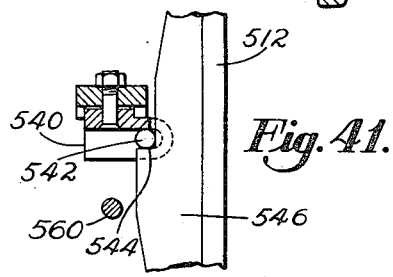
Inventor
Paul H. Dixon
By his Attorney

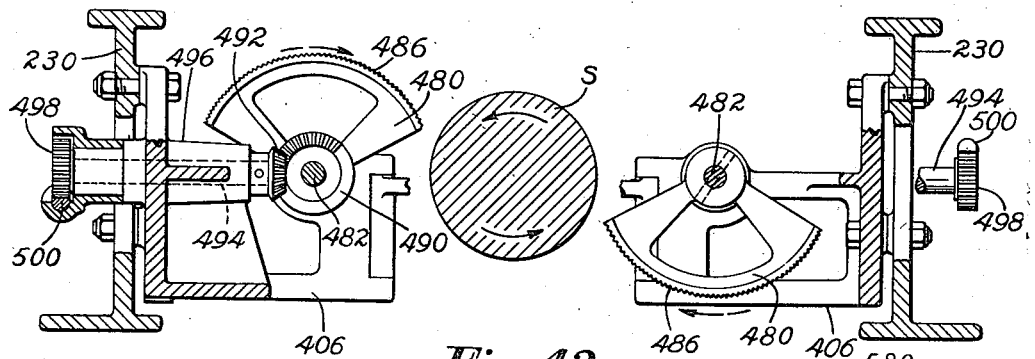
Fig. 42.
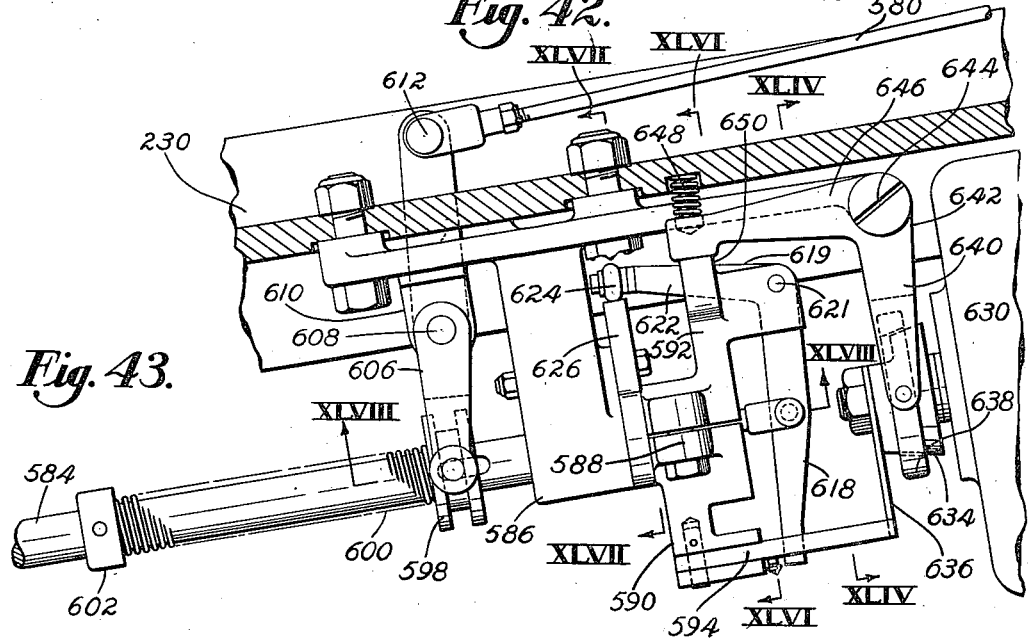
Fig. 43.
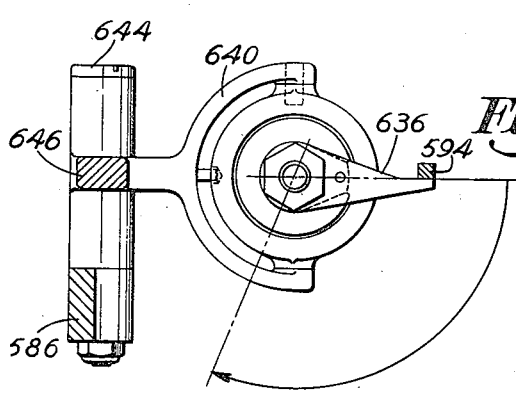
Fig. 44.
Inventor
Paul H. Dixon
By his Attorney

*Inventor*
Paul H. Dixon
By his Attorney

Patented June 3, 1952

2,598,766

UNITED STATES PATENT OFFICE 2,598,766

GUN LOADING MECHANISM

Paul H. Dixon, Rockford, Ill., assignor to United Shoe Machinery Corporation, Flemington, N. J., a corporation of New Jersey Application April 6, 1948, Serial No. 19,237

15 Claims. (Cl. 89—33)

This invention relates to loading mechanisms for guns, and more particularly to mechanisms for automatically loading guns of large caliber. The invention is disclosed herein as embodied in a gun arranged to be mounted in the nose of an airplane, although it is to be understood that, in its broader aspects, the invention is not thus limited in its applicability.

An object of the invention is to provide improved means for transferring shells one at a time from a stationary magazine to a gun which is mounted for movements in azimuth and in elevation. In accordance with a feature of the invention, the shells are transported from the magazine by a loading beam which is guided for movement between a predetermined position relatively to the magazine to a position which is dependent upon the position of the gun in azimuth and in elevation. Thus no matter in which of its positions the gun may be aimed the loading beam will always carry the shell into alinement with the bore of the gun so that it may be readily rammed thereinto.

The shells are carried by a magazine in a generally circular formation and are fed one at a time to the upper portion of the magazine. In an airplane gun of large caliber in which the weight of the shells is an important factor, it is important to avoid too great an unbalancing of the shells in the magazine. Accordingly, it is an object of the invention to provide, in a magazine of the type described, mechanism for automatically feeding the shells alternately from opposite sides of the magazine to a position to be received by the loading beam.

A further object of the invention is to provide, in combination with mechanism for transporting shells from a magazine to a gun, mechanism which is effective during such transporting for setting the fuses of the shells. This is accomplished in accordance with a further feature of the invention by rotating the shell through a predetermined angle as it is carried by the beam. Provision is made for holding the fuse ring of the shell against rotation for a time dependent upon the desired fuse setting time and then releasing the holding means so that during the completion of the rotative movement of the shell there will be no relative movement between the ring and shell beyond that which is desired in order to obtain the correct fuse setting time.

The above and other features of the invention including various novel combinations of parts and details of construction will now be described by reference to the accompanying drawings and pointed out in the claims.

In the drawings,

Fig. 3 is a section on the line III—III of Fig. 1;

Fig. 4 is a section on the line IV—IV of Fig. 3;

Fig. 8 is a plan view of the cam shaft from which various parts of the mechanism are driven and controlled;

Fig. 9 is a section on the line IX—IX of Fig. 8;

Fig. 10 is a section through the gear and clutch mechanism shown at the left in Fig. 8;

Fig. 11 is a section on the line XI—XI of Fig. 8;

Fig. 15 is a side elevation of the breech end of the gun and the associated guide for the loading beam;

Fig. 16 is a section on the line XVI—XVI of Fig. 15;

Fig. 17 is a section on the line XVII—XVII of Fig. 15;

Fig. 18 is a section on the line XVIII—XVIII of Fig. 15;

Fig. 19 is a section on the line XIX—XIX of Fig. 15;

Fig. 20 is a rear elevation of the shell magazine;

Fig. 21 is a side elevation of a portion of the mechanism shown in Fig. 20;

Fig. 24 is a front elevation of the mid portion of one side of the magazine with the associated shell support shown partly in section;

Fig. 25 is a rear elevation on a larger scale of a portion of the mechanism shown in Fig. 24;

Fig. 26 is a front elevation of a portion of the mechanism shown in Fig. 24, with certain parts removed;

Fig. 27 is a front elevation of the magazine feed control mechanism;

Fig. 28 is a section on the line XXVIII—XXVIII of Fig. 27;

Fig. 29 is a section on the line XXIX—XXIX of Fig. 27;

Fig. 30 is a view of a portion of the mechanism shown in Fig. 27 with the parts in different positions;

Fig. 33 is a section on the line XXXIII—XXXIII of Fig. 2;

Fig. 34 is a section on the line XXXIV—XXXIV of Fig. 33;

Fig. 35 is a section on the line XXXV—XXXV of Fig. 33;

Fig. 36 is a section on the line XXXVI—XXXVI of Fig. 34;

Fig. 36a is a section on the line XXXVIa—XXXVIa of Fig. 36;

Fig. 37 is a section on the line XXXVII—XXXVII of Fig. 2;

Fig. 38 is a section on the line XXXVIII—XXXVIII of Fig. 37;

Fig. 39 is a section on the line XXXIX—XXXIX of Fig. 38;

Fig. 40 is a section on the line XL—XL of Fig. 2;

Fig. 41 is a section on the line XLI—XLI of Fig. 37;

Fig. 42 is a section on the line XLII—XLII of Fig. 2;

Fig. 43 is a plan view partly in section of mechanism for controlling the fuse setting time;

Fig. 44 is a section on the line XLIV—XLIV of Fig. 43;

Figure 1:
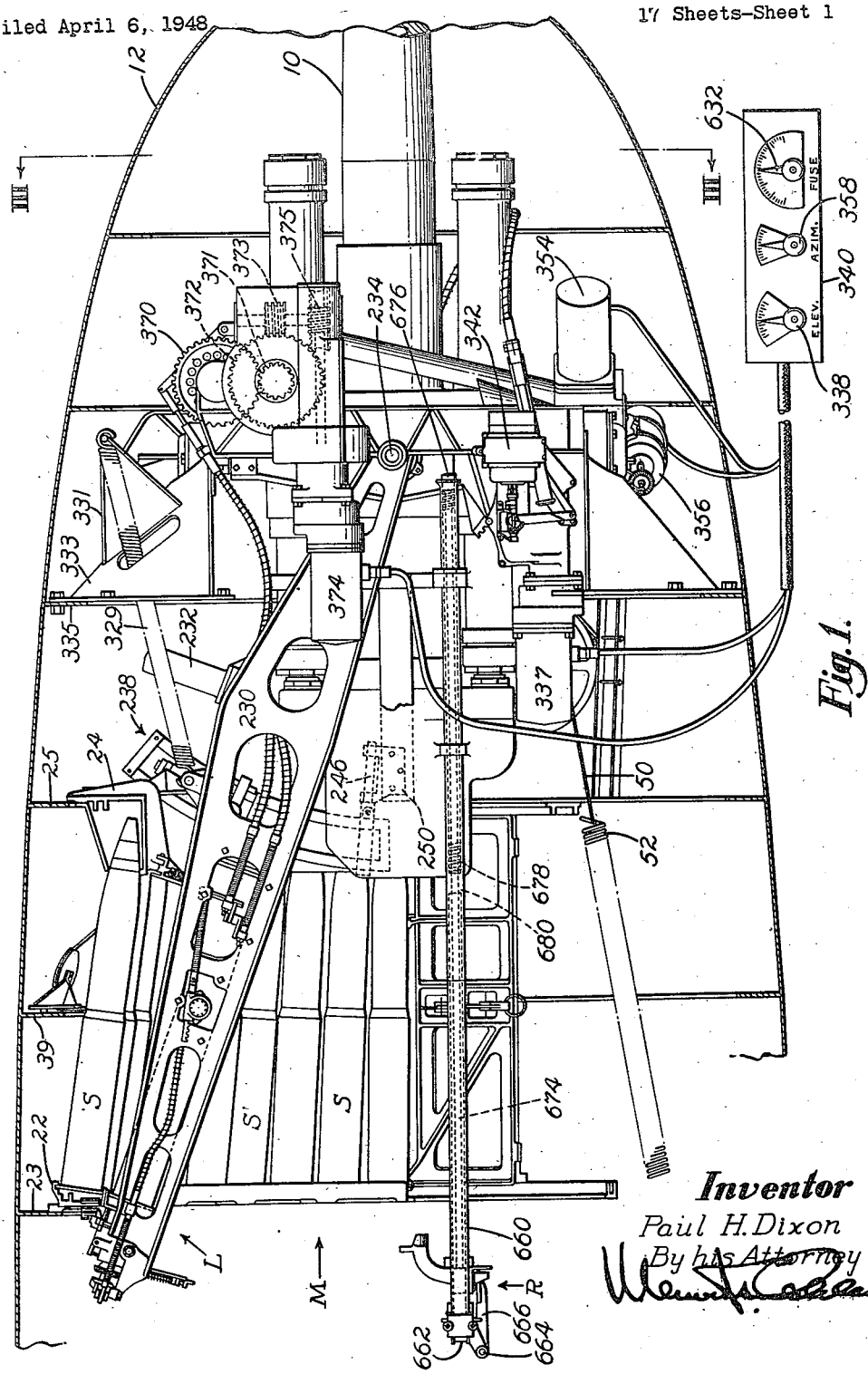
Fig. 1 is a side elevation of one form of mechanism in which the invention is embodied.

The invention is illustrated as embodied in loading and fuse-setting mechanism for a large caliber gun 10 (Figs. 1, 2 and 3) carried by and projecting through the nose 12 of an airplane. The gun is mounted in the nose of the airplane for limited movements in azimuth and in elevation. As shown in Fig. 3 the gun includes trunnions 14 journaled in bearings 16 carried by a gimbal 18 for movement of the gun about a horizontal axis relatively to the gimbal 18. The gimbal 18 includes upper and lower trunnions 19 journaled in bearings 20 for movements about a vertical axis whereby the gun may be moved with the gimbal in azimuth.

Carried by the airplane just rearwardly of the gun 10 and wholly independently thereof is a shell magazine M in which are arranged a plurality of shells S (Fig. 20) in semicircular formation. The shells are arranged in two groups at opposite sides of the center line of the gun and are fed alternately from the two sides of the magazine thereby to avoid any excessive unbalance in the weight of the shells in the airplane. The shells are carried one at a time by a loading beam L (Fig. 1) from the upper central portion of the magazine downwardly and into alinement with the bore of the gun. The loading beam is arranged as will be explained, always to move upwardly into the same position irrespective of the directions in which the gun is aimed and to carry the shell downwardly into alinement with the bore of the gun in any position of the gun. During the downward movement of the loading beam the fuse of the shell is set a predetermined amount and as soon as the shell is carried into alinement with the gun it is rammed into the gun by a rammer R.

Figure 22:
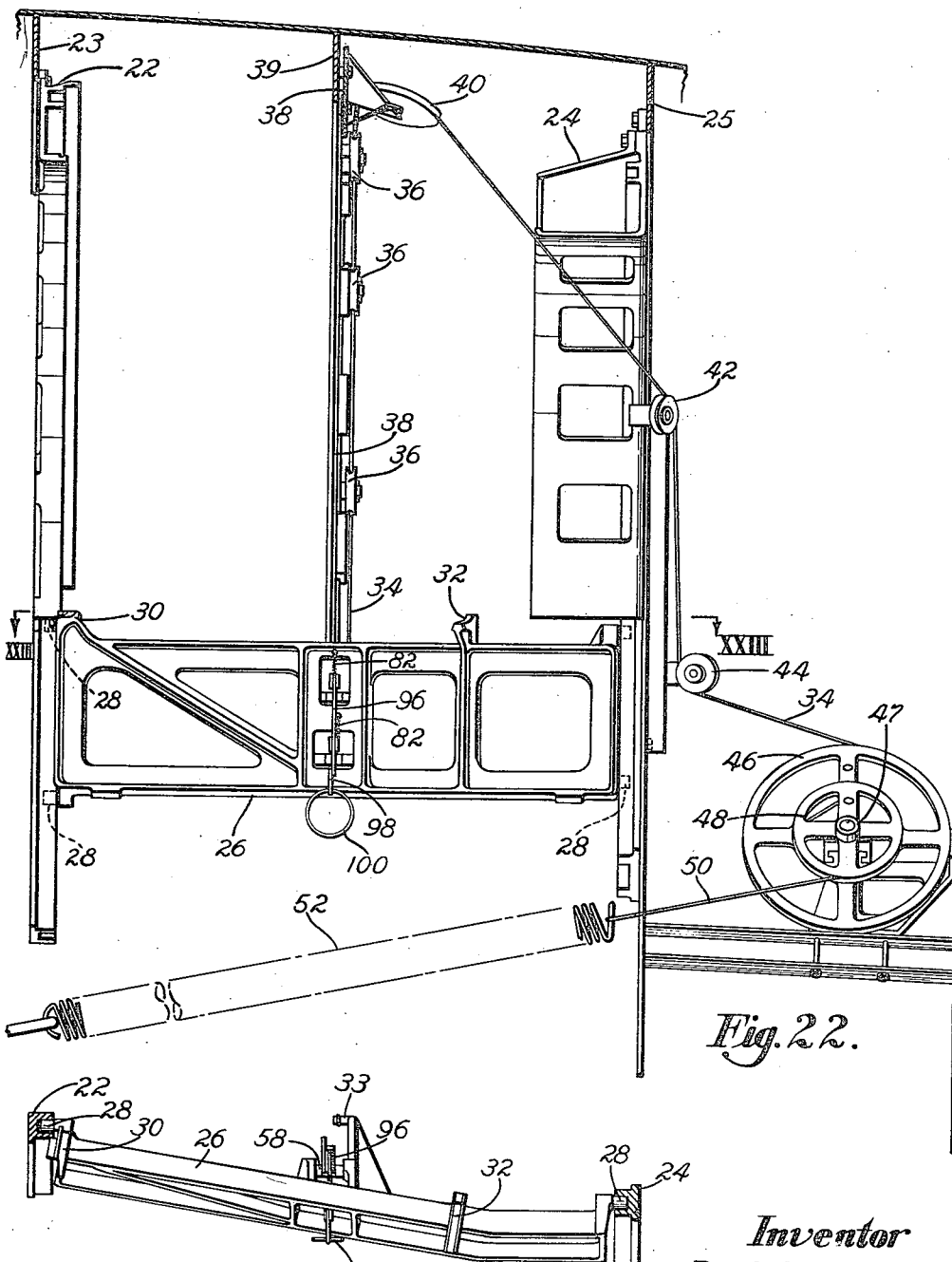
Fig. 22 is a section on the line XXII—XXII of Fig. 20.
Figure 23:
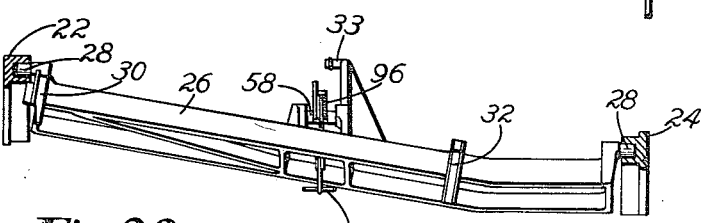
Fig. 23 is a section on the line XXIII—XXIII of Fig. 22.

Each section of the magazine is formed of supporting rings 22, 24 (Figs. 1 and 22) carried by ribs 23, 25 respectively, secured to the interior of the airplane, in which rings ride the rear and front portions of the shells respectively. The weight of each group of shells is sustained by a support 26 having carrying rolls 28 which travel in grooves in the rings 22, 24 (Fig. 23). Each support 26 has a pair of shell-engaging members 30, 32 upon which rests the lowermost shell of the respective group. Attached to a bar 33 carried by each support 26 is a cable 34 (Fig. 24) which passes over guide pulleys 36 carried by a ring 38 secured to a rib 39 in the interior of the airplane between the supporting rings 22, 24. The cable 34 also passes over pulleys 40, 42, 44 (Fig. 22) and is fastened to a large pulley 46 secured to a shaft 47 journaled in the interior of the airplane just forwardly of the magazine. To the shaft 47 is secured a second pulley 48 to which is fastened one end of a cable 50 the other end of which is secured to an end of a heavy tension spring 52. The spring 52 acts to move the pulley 46 in a clockwise direction as viewed in Fig. 22 thereby to move the shell support 26 secured to the end of the cable 34, upwardly to feed the shells into position to be engaged by the loading beam. Mechanism to be described controls upward movement of the support 26. It will be understood that the support 26 at the other side of the magazine is connected to a heavy tension spring in a manner similar to the connection of the support 26 to the spring 52.

Each of the rings 38 carrying the pulleys 36 is provided with a series of spaced stops 54, with which cooperate latches 56 (Figs. 24 and 25) pivoted at 58 to ears 60 carried by the support 26. With the parts in the position shown in these figures the upper latch is hooked over the upper end of a stop 54 whereas the lower latch engages the underside of the same stop. If now the lower latch is retracted or moved in a clockwise direction as viewed in Fig. 25, the support 26 will be free to be moved upwardly by the aforedescribed spring 52 acting on the cable 34 until the upper latch 56 engages the underside of the next stop. At this time the lower latch will engage over the upper edge of the stop shown in Fig. 25 thus effectively locking the shell support into whatever position it has been moved. If the upper latch 56 is next retracted or moved out of engagement with the undersurface of the associated stop another upward movement is imparted to the shell support. Thus it will be understood that in order to impart successive upward movements to either shell support alternate retractive movements are imparted to the latches associated therewith.

For thus alternately moving the two latches 56, a latch release ring 62 (Figs. 25 and 26) is mounted for limited sliding movement relatively to the ring 38. Pins 64 carried by the ring 62 cooperate with slots 66 in the ring 38 to limit the movement of the ring 62. The ring 62 carries suitably spaced ears 68 which cooperate with release arms 70 pvioted at 72 to the latches 56. Springs 76 (Fig. 24) act between the latches and pins 78 in the release arms 70 to hold the release arms in the positions shown in Fig. 25 in which projecting ends of the pins 78 engage the adjacent surfaces of the latches. The latches 56 are provided with arms 80 to which are secured springs 82 the other ends of which are secured to pins 84 carried by the support 26 to urge the latches into locking engagement with the stops 54. Assume now that the ring 60 is moved upwardly, the ear 68 engages the release arm 70 on the lower latch 56 to move the latch out of engagement with the adjacent surface of the stop 54 whereupon the support 26 is free to move upwardly until the upper latch engages the bottom of the next stop. Upon return movement of the release ring, the next uppermost ear 68 will engage the upper release arm 70 which will move relatively to the latch against the action of the spring 76 to permit downward movement of the ear thereby. Upon the next reciprocation of the ring 62 the upper latch will be similarly operated by this other ear 68 on the ring, the support moving upwardly each step sufficiently to move another shell into position to be received by the loading beam. As will be explained, the rings 62 associated with each side of the magazine are operated alternately so that the supports at opposite sides of the magazine are moved alternately.

In loading the magazine the supports 26 must be moved downwardly to their lowermost positions against the action of the springs 52. For this purpose each shaft 47 carrying the pulleys 46, 48 is provided with a bevel gear 84 (Fig. 21) arranged to mesh with a gear 86 in a gear housing 88. A worm gear 90 on the shaft of the bevel gear 86 is engaged by a worm 92 arranged to be turned by a crank 94 thereby to turn the pulleys against the actions of the springs to move the associated support 26 downwardly. The housing 88 with gears 86, 90, 92 is removable as a unit from a bracket 95 in which the shaft 47 is journaled, so as not to interfere with the normal loading operation during firing of the gun. During this downward movement of the supports the latches 56 must be held in retracted positions. For this purpose the arms 80 (Fig. 25) have pin and slot connections with a bar 96 to the lower end of which is pivoted a recessed latch member 98 carrying a handle 100. By moving the bar 96 downwardly the latches are retracted and are held in their retracted positions by hooking the latch 98 over a flange 102 on the support 26. After the resepective side of the magazine has been filled with shells and the support 26 is in its lowermost position the latch 98 is moved into the position shown in Fig. 24 whereby the support will be locked by the latches 56 against upward movement and the gear housing 88 can then be removed from the bracket 95.

Mechanism for alternately operating the release rings 62 at the opposite sides of the magazine is illustrated in Figs. 27 to 30. A cable 110 (Fig. 26) connects the upper end of one of the release rings with a slide bar 112 (Fig. 27) and the other release ring is connected by a cable 114 with a slide bar 116. These slide bars are carried by a support 118 secured by screws 120 to the rib 39 by which the rings 33 are supported. Between the slide bars 112 and 116 is a slide bar 122 connected by a cable 124 to mechanism which moves the bar 122 to the left as viewed in Fig. 27 upon each cycle of operation of the gun, by mechanism to be described. A spring 126 connected between a pin 128 depending from the slide bar 122 and a frame member 130 urges the bar 122 to the right. The movement of the bar 122 by the spring 126 is limited by engagement of an upturned end 132 of the bar 122 with a frame member 134. The bars 112 and 116 are also urged to the right by springs 136 and 138, respectively, and these bars have upturned ends engageable with the frame member 134 to limit the movements of these bars by their respective springs.

Pivoted on the bar 132 is a lever 140 having pivotal connections at 142, 144 with pull members 146, 148, respectively. A link 150 connects these pull members together at one end, the opposite ends thereof being provided with hook portions 152, 154 arranged for engagement with projections 156, 158 on the bars 112, 116, respectively. The lever 140 has an arm 160 connected by a spring 162 to the bar 122. This spring acts to move the lever 140 into either one of two extreme positions in which the arm 160 of the lever engages one or the other of the pins 164, 166 carried by the pull members 146, 148 respectively.

Assume that the parts are in the positions shown in Fig. 27 and that the bar 122 is moved to the left, the hook portion 154 of the pull member 148 engages the projection 158 on the bar 116 moving this bar to the left and operating the corresponding release ring. After the release ring has been moved as far as it can go the bar 122 moves relatively to the pull member 148, rocking the lever 140 in a counterclockwise direction, thus causing the pull members to shift into the positions shown in Fig. 30, in which positions they are held by the spring 162. After the bar 122 is returned to its initial position, the hook portion 152 of the pull member 146 will be snapped by the action of the lever 140 thereon into operative relation to the projection 156 on the bar 112 and the pull member 148 will move out of operative relation to the projection 158 and will assume a position corresponding to the position of the pull member 146 in Fig. 27. The parts are now positioned so that upon the next operation of the bar 122 the bar 112 will be operated to move the release ring 62 at the opposite side of the magazine, during the latter part of which operation the parts will again be shifted as heretofore described. Thus, it will be seen that successive operations of the slide bar 122 will cause alternate operations of the bars 112, 116, whereupon the shells will be fed alternately in opposite sides of the magazine by the mechanism heretofore described.

Figures 31, 32:
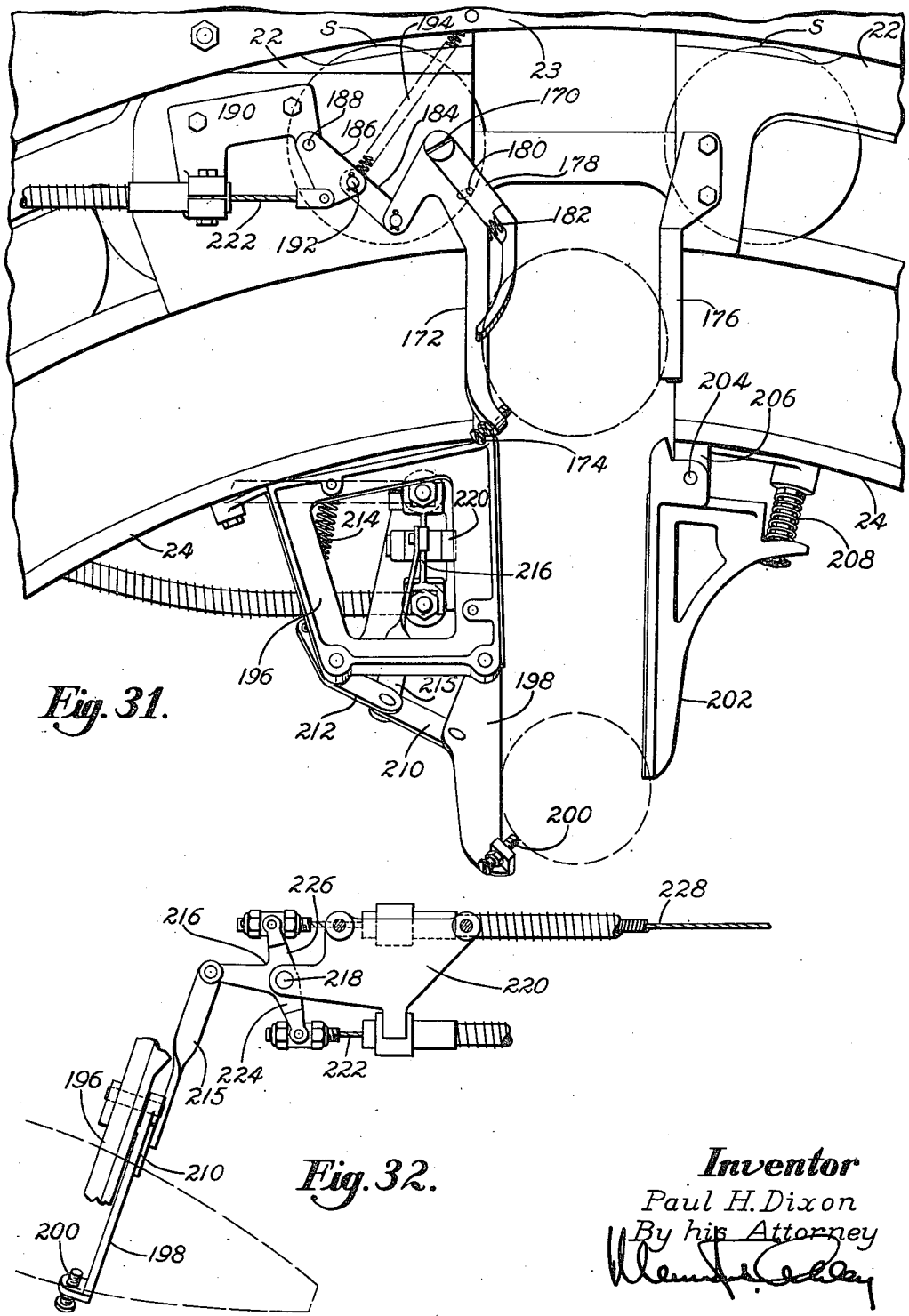
Fig. 31 is a rear elevation of mechanism associated with the magazine for supporting a shell prior to its engagement by the loading beam.
Fig. 32 is a side elevation of a portion of the mechanism shown in Fig. 31.

As shown in Fig. 31 the shell-supporting rings 22, 24 at opposite sides of the magazine are spaced from each other at their upper portions to permit a shell to drop therebetween into position to be engaged by the loading beam. Mechanism is associated with each set of supporting rings to hold the shell in the desired position until the loading beam moves upwardly to receive the shell. Pivoted at 170 to the left-hand ring 22 and depending therefrom is an arm 172 having threaded through the lower end thereof a screw 174 arranged for engagement with the back end of a shell. A stationary vertical bar 176 secured to the other ring 22 cooperates with the screw 174 to provide a support for the back end of the shell as long as the arm 172 remains in the position illustrated in Fig. 31. Also pivoted at 170 is an arm 178 having a pin and slot connection 180 with the arm 172 and urged outwardly of the arm by a spring 182. Upon downward movement of a shell from one of the rings 22 the arm 178 will be moved by the shell against the action of the spring 182 until the shell falls into engagement with the screw 174, whereupon the arm 178 is forced by the spring against the shell which is accordingly engaged at three locations to hold the rear end of the shell steady until it is released to the loading beam. The arm 172 is connected by a link 184 to a lever 186 pivoted at 188 on a bracket 190 carried by the ring 22. The link 184 and lever 186 are connected by a pin 192 to which is connected one end of a tension spring 194, the other end thereof being connected to the rib 23 carrying the rings 22. The link 184 and lever 186 form a toggle which is illustrated in Fig. 31 as being in straightened position and held in such position by the spring 194. This toggle is arranged to be broken by movement of the lever 186 in a clockwise direction when the shell is to be released to the loading beam, thus moving the arm 172 in a clockwise direction carrying the screw 174 away from the shell.

Secured to the left-hand forward shell-supporting ring 24 and depending therefrom is a bracket 196 to which is pivoted an arm 198 through the lower end of which is threaded a screw 200 engageable with the under surface of the nose of the shell. This screw cooperates with a shell-engaging arm 202 pivoted at 204 to a bracket 206 carried by the other ring 24. A spring 208 urges the arm 202 in a clockwise direction, thereby holding the nose of the shell in contact with the screw 200 until the arm 198 is moved out of the position shown in Fig. 31. A mid portion of the arm 198 is connected by toggle links 210, 212 to the bracket 196, the arm 198 being in supporting relation to the shell when the toggle links are in straightened positions as indicated, in which positions they are normally held by a spring 214 connected between the bracket 196 and an extension of the toggle link 212. The knee of the toggle 210, 212 is connected by a link 215 to one arm of a lever 216 pivoted at 218 to a support 220 carried by the bracket 196. When the lever 216 is pivoted in a clockwise direction as viewed in Fig. 32 the toggle 210, 212 is broken and the arm 198 is moved out of supporting engagement with the nose of the shell. In order that the arms 172, 198 supporting the rearward and forward portions of the shell be retracted simultaneously, the levers 186, 216 are arranged to be operated simultaneously. The lever 186 is connected by a cable 222 to a downwardly projecting arm 224 of the lever 216 so that upon clockwise movement of the lever 216 its movement will be transmitted through the cable 222 to cause clockwise movement of the lever 186 so that, as heretofore explained, the arm 172 is moved out of engagement with the shell. The lever 216 has an upwardly extending arm 226 to which is connected a cable 228 arranged to be moved to the right as viewed in Fig. 32 by mechanism to be hereinafter described, thereby to cause simultaneous movements of the arms 172, 198 permitting the release of the shell held thereby to the loading beam.

The loading beam L by which the shells are transported from the magazine into ramming position in alinement with the bore of the gun comprises a pair of arms 230 (Fig. 2) directly connected together at their rearward ends and connected intermediate their ends by a cross frame member 232. The forward ends of the arms 230 are pivotally secured by pins 234 (Fig. 3) to a supporting frame 236 which is in turn pivotally carried by the upper and lower trunnions 19 of the gimbal 18. This mounting of the loading beam enables the beam to move about both a horizontal axis and a vertical axis relatively to the gun. It is necessary that the loading beam be moved into the proper position during its upward movement to receive the shell in the central portion of the magazine no matter in what position the gun is directed in azimuth. However, the loading beam must carry the shell downwardly into a position determined by the position of the gun in azimuth as well as the position of the gun in elevation in order that the shell will be properly positioned for ramming.

For guiding the loading beam in its vertical movements a guide track 238 (Fig. 15) is provided. This guide track includes a pair of spaced guide rails 240 secured together by straps 242. The lower end of the track is pivoted at 244 to the rearward end of a rod 246 journaled in bearings 248 carried by a bracket 250. This bracket is secured to a rearwardly extending arm 252 of the gun carriage so that the lower end of the track 238 assumes a position dependent upon the positions of the gun both in azimuth and in elevation. For supporting the upper end of the track 238 a bracket 254 is secured to the forward wall of one of the shell-supporting rings 24 and is provided at its lower end with spaced alined bearings 256 (Fig. 18) in which is journaled a shaft 258 carrying at its lower end a bracket 260. A horizontally disposed bearing sleeve 262 extends laterally from the lower end of the bracket 260 and journaled therein is a shaft 264 carried by a U-shaped frame 266 in the arms of which are journaled pins 268 in axial alinement. On the inner ends of these pins are U-shaped guide members 269 arranged slidably to receive the rails 240 of the guide track. Upon movement of the gun in azimuth the guide track will pivot about the axis of the pins 268 and these pins are so located that that portion of the track near the shell to be received by the loading beam has substantially no movement relatively to the shell. Upon movement of the gun in elevation the lower end of the track will move with the gun carriage, as heretofore explained, and the upper end will slide in the guide members 269.

Projecting laterally from the loading beam L is a rod 270 (Fig. 18) threaded to receive nuts 272 by which the rod may be adjusted relatively to the beam. The outer end of the rod carries a spherical head 274 (Fig. 19) on which is mounted for universal movement a grooved wheel 276 arranged to embrace the rails 240 of the guide track 238 as shown in Fig. 16. Accordingly, upon vertical movement of the loading beam it will be guided in its lateral movements by the positions of the guide track 238 which is in turn controlled by the position of the gun in azimuth. Thus no matter what the position of the gun is in azimuth, the loading beam will be properly guided for movement between shell-receiving and ramming positions.

Figure 12:
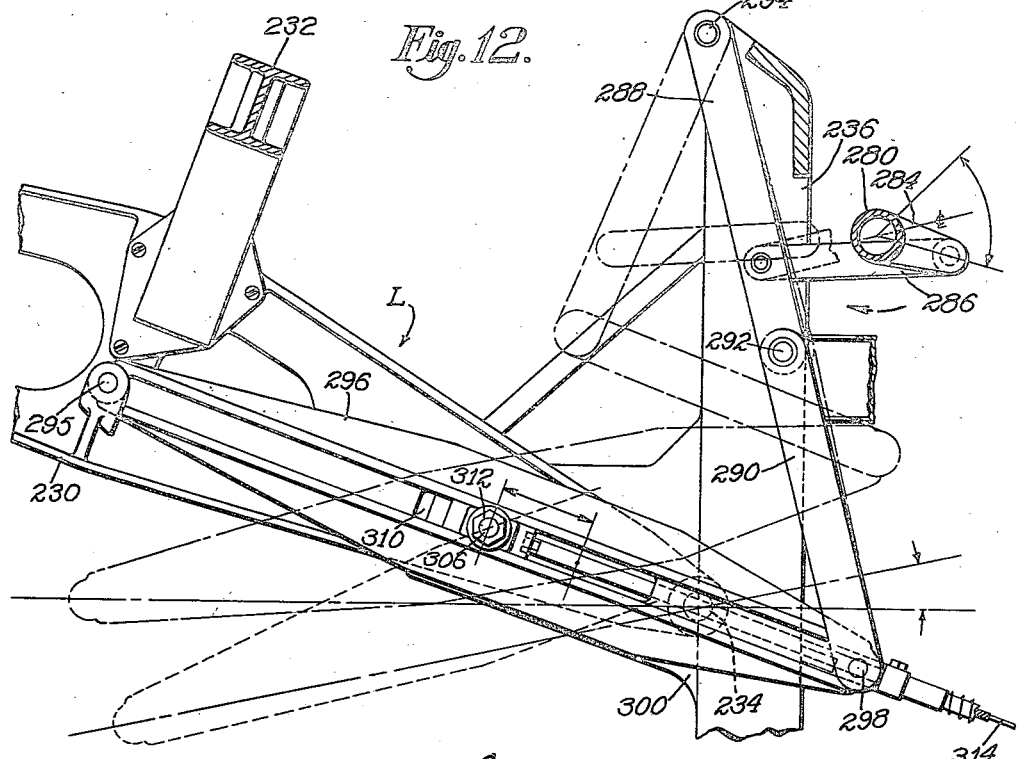
Fig. 12 is a section on the line XII—XII of Fig. 3.

For operating the loading beam a drive shaft 280 (Figs. 8 and 12) is journaled in the upper portion of the frame member 236. This shaft is turned one complete revolution for each cycle of the gun by mechanism to be described and carries at one end a crank 284 connected by a link 286 to one of a pair of toggle links 288, 290 pivotally connected at 292. The upper toggle link 288 is pivoted at 294 to the upper end of the frame member 236. The lower toggle link 290 is connected to the loading beam L in such manner that the loading beam will move from its shell-receiving position downwardly a distance which is dependent upon the position of the gun in elevation. Thus if the gun is aimed upwardly the loading beam will move downwardly a greater distance to carry the shell into alinement with the bore of the gun than will be necessary if the gun is aimed downwardly.

Pivoted to one of the side arms 230 of the loading beam at 295 is a walking beam 296 which extends forwardly of the beam-supporting frame 236 and is pivotally secured at its forward end by a pin 298 with the lower end of the toggle link 290.

Figure 13:
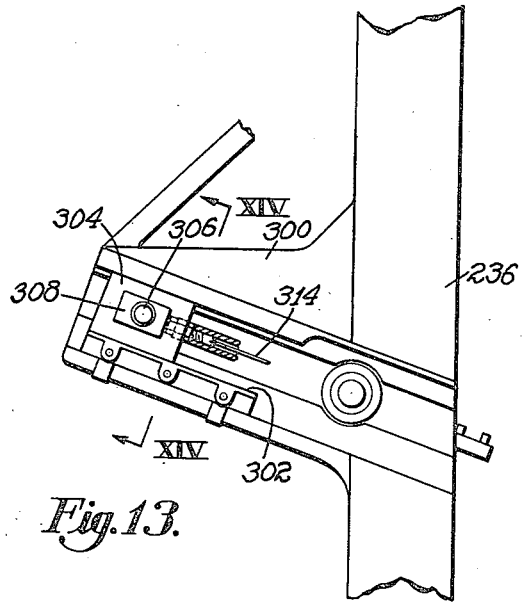
Fig. 13 is a view of a portion of the mechanism shown in Fig. 12 with some of the parts removed.
Figure 14:
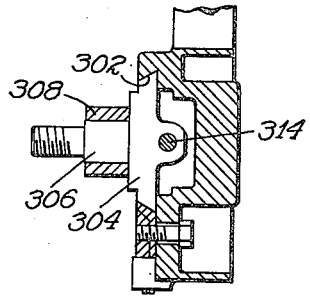
Fig. 14 is a section on the line XIV—XIV of Fig. 13.

The walking beam has an adjustable pivotal connection with a bracket 300 extending rearwardly from the frame 236. This bracket is formed with a guideway 302 (Figs. 13 and 14) to receive a slide 304 extending laterally from which is a pivot pin 306 on which is journaled a block 308. This block is movable in a slot 310 (Fig. 12) in the walking beam 296 and is retained therein by a nut and washer 312 on the threaded outer end of the pivot pin 306. It will be understood that the position of the slide 304 along the slideway 302 will determine the axis about which the walking beam 296 pivots during rotation of the shaft 280. Furthermore, the distance between the pivot 306 and the pivot 298 will determine the extent of movement of the walking beam and consequently the extent of downward movement of the loading beam 239. With the toggle links in straightened positions the pivots 295, 312 and 234 are in alinement, the loading beam is in its upper position, and the position of the pivot 312 lengthwise of the walking beam has no effect on the upper position of the loading beam. Consequently by adjusting the slide 304 with the pivot 306 in accordance with the elevation of the gun the extent of downward movement of the loading beam is readily controlled to correspond therewith.

Figure 5:
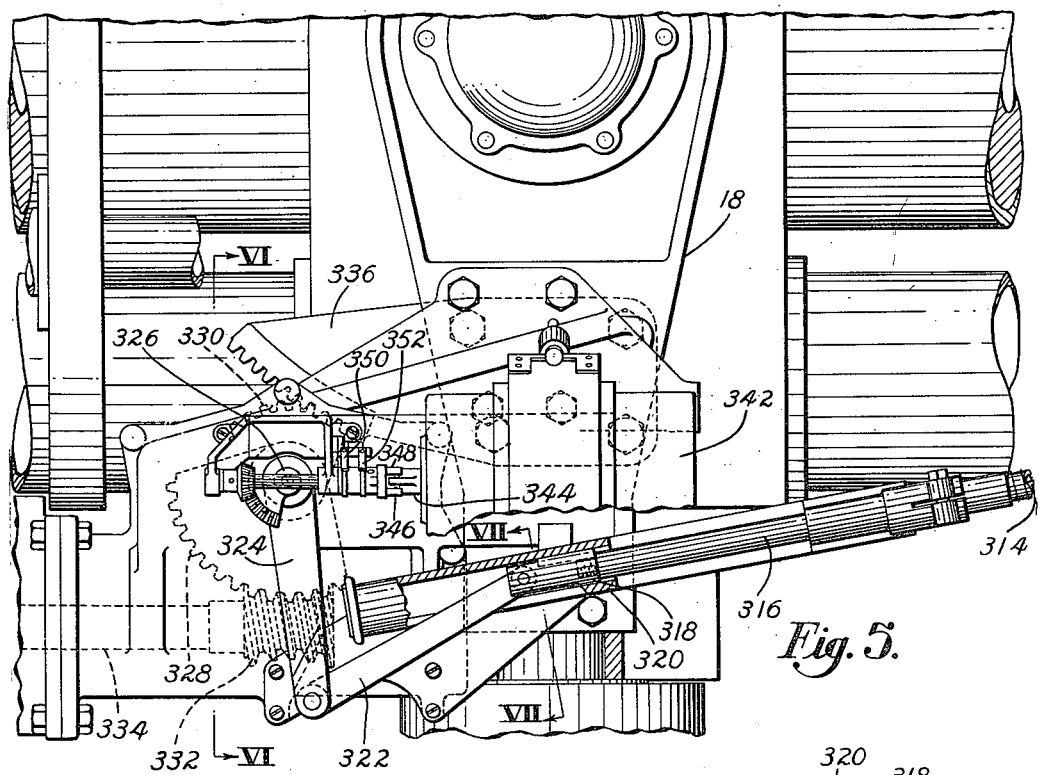
Fig. 5 is a side elevation partly in section of the mechanism for adjusting the elevation of the gun and associated mechanism.
Figure 6:
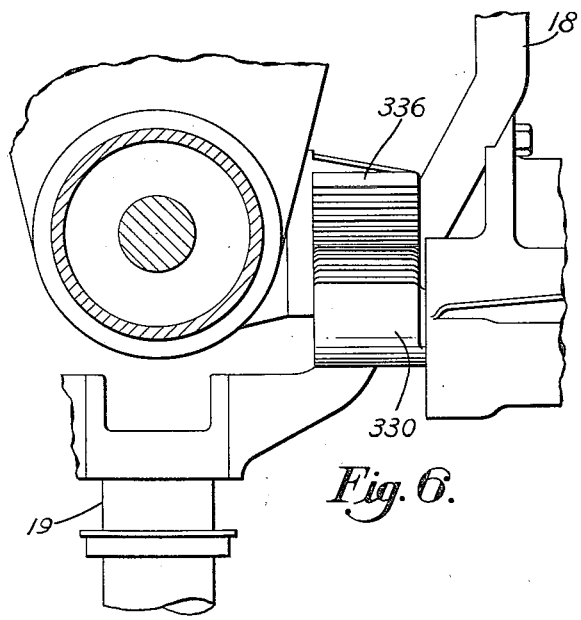
Fig. 6 is a section on the line VI—VI of Fig. 5.
Figure 7:
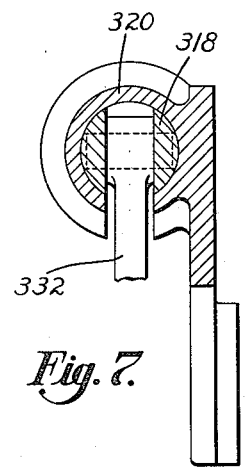
Fig. 7 is a section on the line VII—VII of Fig. 5.

Secured to the slide 304 is one end of a cable 314 the other end of which is secured to a rod 316 (Fig. 5) threaded into a block 318 slidable in a sleeve 320 at the opposite side of the gun. This sleeve is secured to the gimbal 18 and accordingly moves with the gun in azimuth but not in elevation. The block 318 is connected by a link 322 to an arm 324 secured to a shaft 326 carrying gear segments 328 and 330. The segment 328 meshes with a worm 332 carried by a shaft 334 which is arranged to be rotated by mechanism to be described when the position of the gun in elevation is to be changed. The gear segment 330 meshes with a segment 336 secured to the gun carriage so that upon rotation of the shaft 334 the segment 336 is turned through worm 332 and segments 328, 330. Simultaneously with the movement of the gun in elevation the arm 324 moves to vary the position of the block 318 in the sleeve 320 and by its connection to the slide 304 (Figs. 13 and 14) varies the position of the axis about which the walking beam 296 pivots. Accordingly, the position of the gun in elevation controls the extent of downward movement of the loading beam L so that the shell is always brought into alinement with the bore of the gun.

Springs 329 (Figs. 1 and 2) connected between arms 230 of the loading beam L and arms 331 extending forwardly from a plate 333 secured to a rib 335 of the airplane, assist the mechanism heretofore described in returning the loading beam to its shell-receiving position.

The shaft 334 (Fig. 5) is driven by a motor 337 (Fig. 1) which is in turn controlled by a self-synchronous control system. Such systems are old in the art and that employed here is not shown in detail but it will be understood that such a system includes a transmitter (not shown) the position of the armature of which is controlled by handle 338 on a control panel 340. A receiver 342 (Figs. 1 and 5) carried by the inner gimbal 18 has an armature 344 which moves to a position corresponding to the armature of the transmitter. This armature closes a circuit through one of a pair of contacts 346, 348 through collector rings 350, 352 to drive the motor 337 (Fig. 1) in one direction or the other depending upon the direction of rotation of the armature of the receiving Selsyn. The motor 337 will continue to operate until the armature of the receiving Selsyn has moved to a position corresponding to that of the handle 338 of the control panel 340 and the circuit through contacts 346, 348 is broken whereupon the drive comes to rest.

A similar system is provided for moving the gun in azimuth. A drive motor 354 (Figs. 3 and 4) carried by the interior of the plane is controlled by a self-synchronous receiver 356 which is in turn controlled by a transmitter (not shown) operated by a control handle 358 (Fig. 1). The motor operates through suitable reduction gearing, a gear segment 360 which engages a rack 362 on a bracket 364 (Fig. 3) carried by the gimbal 18. Accordingly, rotation of the motor 354 turns the gimbal 18 and moves the gun in azimuth.

Loosely journaled on the shaft 280 is a gear 370 which is constantly rotated through reduction gearing 371, 372, 373, 375 (Fig. 1) by a rotor 374. Keyed to the shaft 280 is a clutch member 376 (Figs. 8 and 9) in the form of a ring carried adjacent to the gear 370. The clutch member includes a clutch element in the form of a plunger 378 slidable in a housing 380 (Fig. 10) and urged by a spring 382 toward the gear 370. The gear is provided with an aperture 384 adapted to receive the adjacent end of the plunger 378 whereby the gear is connected to the shaft 280. The plunger 378 has formed thereon an ear 386 which projects through a slot 388 in the housing 380. This ear cooperates with a clutch throw-out member 390 (Figs. 8 and 9) which is normally held in engagement with the outer surface of the ring 376 and has a cam surface 392 which cooperates with that portion of the ear 386 adjacent to the gear to move the plunger 378 out of clutching engagement with the gear 370 upon the completion of one revolution of the shaft 280.

The throw-out member 390 is pivotally carried by a shaft 394 carried by the upper portion of the support 236 and has an arm 396 extending forwardly thereof connected by a link 398 with the armature of a solenoid 400 (Fig. 3). Upon energization of the solenoid the throw-out member 390 is moved into the broken line position illustrated in Fig. 9 whereupon the spring 382 (Fig. 10) moves the plunger 378 toward the gear 370 and when the aperture 384, in the rotation of the gear moves into alinement with the plunger the gear 370 is connected to the shaft 280 causing the shaft to rotate one revolution. Assuming that the solenoid is de-energized prior to the completion of the rotation of the shaft 280 the throw-out member 390 returns to the full line position shown in Fig. 9 and the ear 386 engages the cam surface 392 causing the plunger 378 to be retracted. A shoulder 401 is formed at the end of the cam surface 392 to form a positive stop with which the ear 386 cooperates, so that the shaft 280 comes to rest in a predetermined position.

Before the arms 172 and 198 (Fig. 31) are moved to release the shell to the loading beam, mechanism associated with the beam is actuated to engage and support the shell in its downward movement. The forward portion of the shell is held by a pair of supports 402 (Figs. 2 and 40) which are formed on the ends of bell crank levers 404 pivoted on brackets 406 secured to arms 230 of the loading beam. Springs 408 connected to one arm of each of the bell crank levers 404 act to move the support 402 into supporting relation to the shell. For holding the supports in inoperative positions when the beam is moved upwardly to receive a shell and also during the ramming operation, links 410 connect the bell crank levers 404 with arms of bell crank levers 412 journaled on pivot pins 414 (Fig. 38) carried by brackets 416 secured to the arms 230 of the loading beam. The bell crank levers 412 have arms 418 projecting outwardly from the loading beam and to these arms are connected cables 420 (Figs. 8, 11 and 37) which are in turn connected to double-armed levers 422 pivoted on the shaft 394. The levers 422 carry cam rolls 424 engageable with the peripheries of cams 426 keyed to the shaft 280. Upon rotation of the shaft 280 the cams 426 rotate in a clockwise direction as shown in Fig. 11 so that at a predetermined time the supports 402 are moved out of engagement with the shell permitting ramming of the shell and at a predetermined time in the completion of the upward movement of the loading beam the cam returns to the position shown in Fig. 11 whereupon the springs 408 (Fig. 2) return the supports 402 into their operative positions.

The rear end of the shell is supported in the carriage by a rotatable chuck 430 (Fig. 33) carried by a shaft 432 which is journaled in a sleeve 434. This sleeve is journaled in the rear portion of the loading beam and has secured thereto a gear 436 for a purpose to be described. The shaft 432 is slidable in the sleeve 434 so that the chuck 430 may be moved rearwardly of the loading beam until the beam is in its shell-receiving position whereupon the chuck is moved forwardly into the position shown in Fig. 33. For thus moving the shaft 432 it is provided at its rearward end with an annular groove 438 in which are located rolls 440 carried by the bifurcated end of a lever 442 (Fig. 2) pivoted at 444 to the rear end of the loading beam. A spring 446 acts between that end of the lever 442 remote from the shaft 432 and a bracket 448 carried by one of the arms 230 of the loading beam to urge the shaft 432 forwardly. A cable 450 (Fig. 8) is connected at one end to the lever 442 and at its other end is connected to a lever similar to the levers 422 of Fig. 11, carrying a cam roll (not shown) engageable with a cam 452 on the shaft 280. It will be understood that upon rotation of the shaft 280 the lever 442 (Fig. 2) is moved in a counterclockwise direction against the action of the spring 446 at a predetermined time in the movement of the loading beam to move the chuck 430 rearwardly after which it is again moved forwardly under the action of the spring 446 to engage the rearward end of the shell.

Secured to the forward end of the sleeve 434 is a bar 454 (Figs. 33 and 34) having at one end a forwardy extending arm 456 which passes through a recess 458 (Fig. 35) in the chuck 430 so that upon rotation of the shell by means to be described and with it the chuck, rotative movement is transmitted by the arm 456 and bar 454 to the sleeve 434 and the gear 436 carried thereby. The fuse is set during the rotative movement of the shell by holding the fuse ring thereof stationary for a predetermined time in the rotation of the shell and this is controlled by the gear 436 as will be described. It is important that the gear come to rest at the completion of the rotative movement of the shell in a predetermined position to maintain the accuracy of the fuse setting. Each shell is rotated 180° and latches are provided to cooperate with one end or the other of the bar 454 to hold the bar in a predetermined position at the completion of each movement of rotation thereof.

Pivoted on a pin 459 carried by an ear 461 projecting upwardly from the rearward end of the loading beam is a latch 460 (Figs. 33, 34, 36 and 36a). A spring 462 interposed between the tail end of the latch 460 and the adjacent part of the loading beam urges the latch into position to be engaged by the bar 454 upon movement of the bar into a vertical position as shown in Figs. 34 and 36a. This latch has pivoted to it on a pin 464 a latch member 466 urged by a spring 468 toward the approaching end of the bar 454 and acts as a shock absorber when the bar 454 comes to rest against it. To prevent retrograde movement of the bar after it has come to rest a second latch 470, pivoted on the pin 459 is provided. This latch is urged by a spring 474 into operative position but is arranged to be cammed upwardly by the approaching end of the bar after which the latch snaps into the position shown in Figs. 34 and 36a thus effectively preventing the bar from moving reversely.

Before the shell can be rotated the latch 460 must be moved out of operative relation to the bar 454. For this purpose the chuck 430 is provided with projections 476 (Figs. 33 and 35) which are diametrically opposite each other so that no matter which position the chuck is in at the completion of a fuse-setting operation one of the projections will be in position to cam the latch 460 upwardly when the chuck is moved rearwardly. When the latch is thus moved upwardly, the latch member 466 (Fig. 36a) is moved by the spring 468 from the position illustrated into a position in which its lower end overlies the adjacent end of the bar 454. When the chuck is again moved forwardly into engagement with another shell the lower end of the latch member rests upon the upper end of the bar 454 holding the latch 460 out of locking engagement with the bar thereby permitting rotation of the shell and with it the chuck and associated parts.

For turning the shell during the downward movement of the loading beam to set the fuse, feed segments 480 (Fig. 42) are provided. These segments are carried by shafts 482 journaled in the brackets 406 for rotation about axes parallel to the longitudinal axis of the shell. These feed segments have toothed peripheries 486 arranged to bite into the shell so that upon rotation of the segments in the directions indicated by the arrow in Fig. 42 they cooperate with each other to turn the shell 180°. Carried by the shafts 482 are bevel gears 490 engageable with bevel gears 492 on shafts 494 journaled in bearings 496 carried by the brackets 406. The outer ends of the shafts 494 carry pinions 498 engageable with racks 500 movable in housings 502 (Fig. 2) to rotate the feed segments. Springs 504 act on the racks normally to hold the segments in the positions shown in Fig. 42 and the racks are moved against the actions of the springs to turn the feed segments in the directions shown by the arrows, by cables attached at one end (not shown) to the racks and at their other ends 506 (Fig. 8) to levers 507 carrying cam rolls engageable with cams 508 on the cam shaft 280. Upon rotation of the cam shaft to move the loading beam downwardly the racks 500 (Fig. 42) are operated to turn the feeding segments, rotating the shell through 180° and during the return movement of the loading beam to receive another shell the feed segments are returned to the positions illustrated by the springs 504 (Fig. 2).

Figure 2:
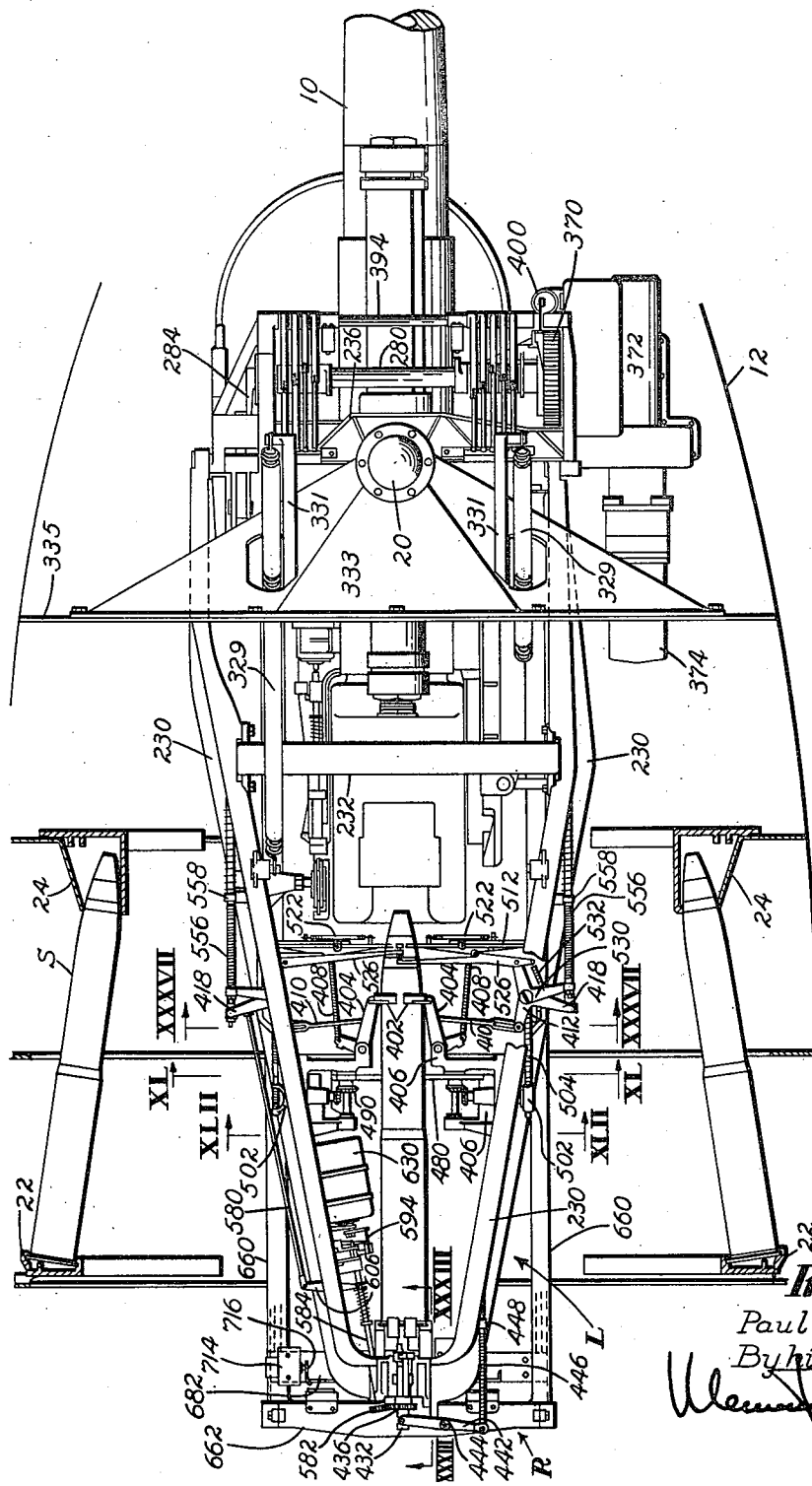
Fig. 2 is a plan view of the mechanism shown in Fig. 1.

Mechanism for holding the fuse ring of the shell stationary during a predetermined portion of the rotation of the shell is illustrated in Figs. 2, 37 and 38. Carried by the side arms 230 of the loading beam are brackets 510 providing slideways for alined slides 512. Each of these slides is provided with a roll 514 (Fig. 37) and a dog 516 arranged to bite into the periphery of the fuse ring. The dogs 516 are pivoted at 518 to the slides and urged into the positions illustrated by springs 520. Springs 522 (Fig. 2) urge the slides 512 into retracted positions so that a shell may be received between them when the loading beam is moved upwardly into shell-receiving position. The slides are then moved toward each other causing the dogs 516 to grip into the fuse ring to hold it stationary during a portion of the rotation of the shell whereupon the slides are then retracted and no further relative movement between the shell and fuse ring takes place. The pivotal mounting of the dogs permits relative movement between them and their supporting slides when the slides are retracted so that they may be readily disengaged from the fuse ring of the shell.

Pivotally carried on pins 524 and extending toward each other are arms 526, a function of which is to move the slides 512 toward each other. The pivot pins 524 are carried by arms 528 (Fig. 38) of bell crank levers 530 which are pivoted on the pins 414. Springs 532 acting between arms 534 of the bell crank levers 530 and extended portions of the arms 526 normally maintain the arms in the positions shown in Fig. 2. Secured to the arms 526 are brackets 540 carrying pins 542 (Figs. 37, 38 and 41), engageable with shoulders 544 (Fig. 41) formed in ribs 546 on the rearward sides of the slides 512. It will be understood that with the arms 526 in the positions shown in Fig. 2 in which they are held by the springs 532, movement of the arms toward each other will cause similar movement of the slides 512 moving them into locking engagement with the fuse ring of the shell. For thus moving the arms 526, the arms 534 of the bell crank levers 530 have connected to them cables 548 (Figs. 8 and 37) connected to levers 550 on the shaft 394, which levers carry rolls (not shown) engageable with cams 552 on the shaft 280. Springs 556 (Fig. 2) act between brackets 558 carried by the loading beam and the bell crank levers 530 to hold the levers in positions in which the slides 512 (Fig. 37) are retracted. However, upon rotation of the cam shaft the bell crank levers are moved against the actions of the springs 556 moving the arms 526 (Fig. 37) toward each other and consequently moving the slides 512 to carry the dogs 516 into locking engagement with the fuse ring. If now the arms 526 are moved relatively to the bell crank levers 530 against the actions of the springs 532 (Figs. 2 and 37) the pins 542 are moved out of engagement with the shoulders 544 (Fig. 41) on the ribs 546 and the springs 522 then retract the slides thereby terminating the fuse-setting operation.

It will be noted in Figs. 2 and 37 that the adjacent ends of the arms 526 are in overlapping relation so that if the arm 526, shown at the left in Fig. 37, is moved about the pivot pin 524 against the action of the spring 532, it will impart similar movement to the other arm 526. For thus moving the arm 526 shown at the left, it is provided with a depending pin 560 arranged to be acted upon by an arm 562 (Fig. 39) of a bell crank lever 564 pivoted at 566 to a bracket 568 carried by an arm 230 of the loading beam. The other arm 570 of the bell crank lever is pivoted to an arm 572 of a second bell crank lever 574 pivoted at 576 to the bracket 568. The bell crank lever 574 has an arm 578 to which is connected a link 580 which, upon movement in the direction of the arrow, shown in Fig. 39, causes clockwise movement of the lever 564 thereby acting on the pin 560 to move the arm 526 into inoperative relation to the slide 512. The link 580 is thus moved by mechanism which will now be described as soon as the fuse has been set the predetermined amount, during the rotation of the shell.

Figure 45:
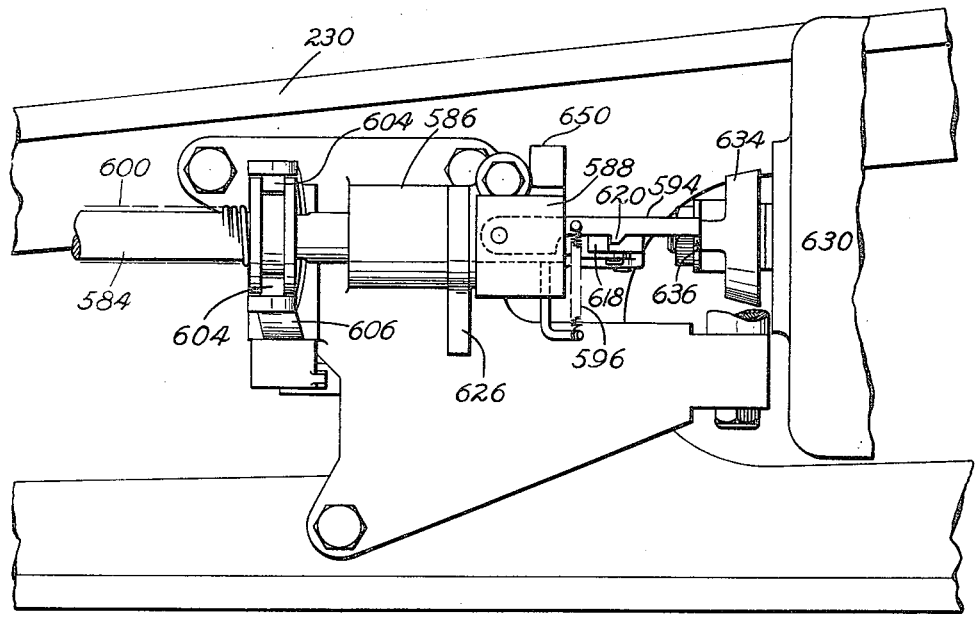
Fig. 45 is a side elevation of the mechanism shown in Fig. 43.
Figure 48:
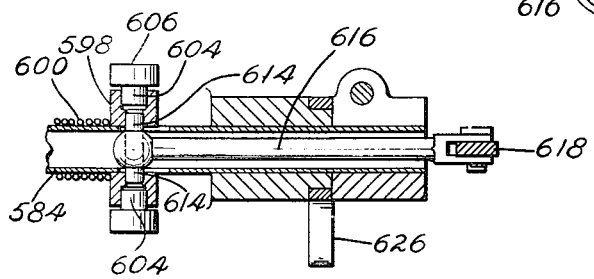
Fig. 48 is a section on the line XLVIII—XLVIII of Fig. 43.

The gear 436 (Fig. 33) which is carried by the sleeve 434 and rotated with the shell as has been described, meshes with a gear 582 (Fig. 2) carried by a shaft 584 (Figs. 43 and 45) the rear end of which is journaled in the rear portion of the loading beam and the forward end of which is journaled in a bracket 586 carried by one of the side arms 230 of the loading beam. Secured to the forward end of the shaft 584 is a block 588 having arms 590, 592, extending outwardly of the shaft in opposite directions. To the outer end of the arm 590 is pivoted a latch 594 held by a spring 596 (Fig. 45) in a position in which it is parallel to the axis of the shaft 584. Slidable on the shaft 584 rearwardly of the bracket 586 is a grooved collar 598 against the rearward face of which abuts one end of a compression spring 600 the other end of which engages a collar 602 pinned to the shaft. The groove of the collar 598 receives pins 604 (Figs. 45 and 48) formed on the lower end of a lever 606 pivoted at 608 to an ear 610 carried by the bracket 586. The other end of the lever 606 is pivoted at 612 to the rear end of the link 580, the action of the spring 600 being to pivot the lever 606 in a counterclockwise direction as viewed in Fig. 43 moving the link 580 rearwardly initiating withdrawal of the slides 512 (Fig. 37) to terminate the fuse-setting operation.

This movement of the lever 606 (Fig. 43) prior to the end of the fuse-setting operation is prevented by mechanism which will now be described. The collar 598 (Figs. 43 and 48) has pins 614 which extend through slots in the forward end of the shaft 584 which is hollow and these pins pass through the generally spherical end of a rod 616 which projects through the forward end of the shaft 584. Pivoted to the forward end of the rod 616 is an arm 618 of a bell crank lever 619 pivoted at 621 to the block 588. During the fuse-setting operation the arm 618 is held in the position shown in Fig. 43 by a projection 620 (Fig. 45) on the latch 594. The bell crank lever 619 has a second arm 622 (Figs. 43 and 47) carrying a roll 624 engageable with the periphery of a stationary cam 626 secured to the bracket 586. The shaft 584 is turned through a complete revolution for each half revolution of the chuck which supports the rear end of the shell during the operation of transferring the shell into alinement with the bore of the gun due to the ratios between gears 436, 582 (Fig. 2). At the completion of each revolution of the shaft 584 the lever 619 (Fig. 43) will be moved into the position shown by the movement of the cam roll 624 over the periphery of the cam 626. At the beginning of a cycle of rotation of the shaft 584 during downward movement of the loading beam, the cam roll 624 rides off the cam 626 but the bell crank lever 619 remains in the position shown by the engagement of the arm 618 (Fig. 45) with the projection 620 of the latch 594, thus holding the lever 606 in the position illustrated in Fig. 43 whereupon the fuse ring is held against rotation during the turning of the shell. As soon, however, as the latch 594 is moved against the action of the spring 596 the arm 618 of the bell crank lever 619 is freed and the spring 600 is effective to move the lever 606 in a counterclockwise direction (Fig. 43) operating the arms 526 (Fig. 37) to permit withdrawal of the slides 512 and thus terminating the fuse-setting operation.

For thus moving the latch 594 (Fig. 43) to terminate the fuse-setting operation at the proper time, a self-synchronous transmission system may be employed which includes a receiver motor 630 (Fig. 43) carried by the arm 230 of the loading beam. This motor includes an armature which is moved into a position corresponding to the position of the armature of a transmitter (not shown) operated by an arm 632 (Fig. 1) in accordance with the desired fuse-setting time. The armature of the receiver 630 is provided with a cone-shaped braking member 634 to the outer end of which is secured an arm 636 which is moved into a position corresponding to the position of the arm 632 of Fig. 1. The outer end of the arm 636 lies in the path of movement of the outer end of the latch 594 so that when the block 588 is rotated sufficiently to cause the outer end of the latch to engage the arm 636 the latch will move relatively to the block thereby freeing the arm 618 of the bell crank lever 619.

Figure 46:
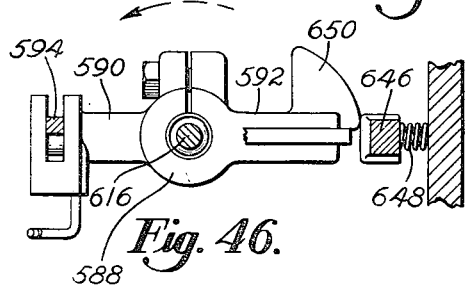
Fig. 46 is a section on the line XLVI—XLVI of Fig. 43.
Figure 47:
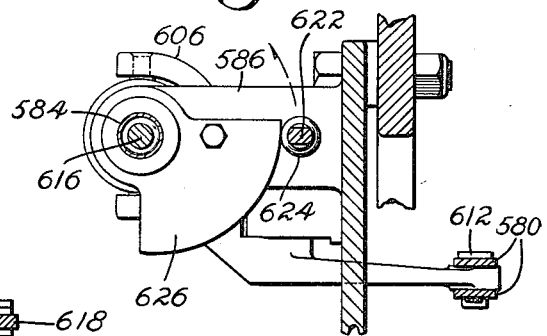
Fig. 47 is a section on the line XLVII—XLVII of Fig. 43.

Because self-synchronous motors are inherently motors of low torque, provision is made to lock the armature of the receiver motor in the position to which it has been set; otherwise engagement of the latch 594 with the arm 636 might merely cause the armature of the receiver to move without freeing the lever 619. Surrounding the braking member 634 is a brake band 638 pivoted to the bifurcated end of an arm 640 of a bell crank lever 642 pivoted at 644 to the bracket 586. The bell crank lever 642 has an arm 646 acted upon by a spring 648 tending to move the lever in a counterclockwise direction as viewed in Fig. 43 to move the band 638 into braking engagement with the member 634. With the parts in their "rest" positions as shown in Fig. 43, the rearward end of the arm 646 of the lever 642 is engaged by a cam 650 (Fig. 46) on the arm 592 of the block 588, which holds the lever 642 in a position in which the band 638 is out of engagement with the braking member 634, so that the armature of the motor 630 is free to turn. As soon, however, as the loading operation starts and shaft 584 is rotated, the cam 650 moves out of engagement with the arm 646, whereupon the spring 648 moves the brake band 638 forwardly to lock the armature of the receiver motor 630 against rotation. When the block 588 has rotated sufficiently the outer end of the latch 594 engages the arm 636 and further movement of the block 588 causes the arm 618 of the lever 619 to move out of engagement with the projection 620 (Fig. 45) of the latch whereupon the spring 600 operates to cause a withdrawal of the mechanism by which the fuse ring is held against turning, as heretofore described.

The end of the fuse-setting operation and the completion of the rotation of the shell takes place before movement of the shell into alinement with the bore of the gun is complete. As soon as the shell has been thus moved it is rammed into the breech end of the gun. The rammer R (Figs. 1 and 2) consists of a pair of tubes 660 secured to the gun carriage at opposite sides of the gun and projecting rearwardly thereof. These tubes are connected at their rearward ends by a cross member 662 to which is pivoted at 664 a latch 666 (Fig. 33). This latch has pivoted to it a rod 668 which extends upwardly through the member 662 and carries a collar 670 between which and the member 662 is confined a spring 672 which urges the latch 666 upwardly. Within the tubes 660 are rods 674 which carry at their forward ends collars 676 (Fig. 1) forming abutments for springs 678. The rearward ends of the springs 678 engage bearings 680 through which the rod 674 pass, the springs acting to move the rods forwardly of the tubes. The rearward ends of the rods 674 are connected by a bar 682 carrying an upwardly and forwardly extending ramming member 684 engageable with the rearward end of the shell. The upper end of the rammer member is bifurcated as shown in Fig. 35, to accommodate the chuck 430. Projecting downwardly from the bar 682 is a latch plate 688 (Fig. 33) arranged to be engaged by the latch 666 when the latch is in its upper position, thereby to hold the rammer in its rearmost position against the action of the springs tending to move it forward.

The latch 666 is moved downwardly by the loading beam when the beam is in its lowermost position, by a plunger 690 (Fig. 33) carried by a rod 692 slidable in bearings 694 and 696. These bearings are carried by a plate 698 secured to and depending from the rearward end of the loading beam. A collar 700 carried by the rod 692 is engaged by one end of a compression spring 702, the other end of which engages the bearing 696. This spring urges the rod 692 downwardly relatively to the plate 698 below the position shown in Fig. 33 so that when the loading beam approaches its lowermost position the member 694 engages the latch 666 and a portion of the blow is absorbed by the spring 702, the arrangement being such that the latch 666 is moved downwardly at the completion of the downward movement of the beam, whereupon the rammer is moved forwardly by the springs acting thereon. The tubes 660 have slots 704 to permit the forward movement of the rammer member 684. The gun is not fired until the loading beam has returned to its uppermost position and the recoil movement of the gun during the firing operation moves the rammer back to the position shown in Fig. 33. A U-shaped latch-lifting member 706 is secured to the under side of the bar 682 of the rammer and engages a cam surface 708 on the forward end of the latch thereby positively lifting the latch into engagement with the latch member 688, to insure that the rammer will be locked in its rearward position in readiness for the next loading operation.

Operation

At the end of a firing cycle the loading beam L is in its up positoin with the chuck 430 (Fig. 33) in engagement with the end of a shell supported by the mechanism shown in Fig. 31 and with the supports 402 (Fig. 40) in engagement with the front end of the shell. The slides 512 are positioned as shown in Fig. 37, so that the fuse ring is locked against rotation for a subsequent fuse-setting operation.

To initiate another firing cycle a switch (not shown) which may be located remotely from the gun is closed by the gunner to energize the solenoid 400 (Fig. 3) providing certain conditions are satisfied. In the circuit to the solenoid is a normally open switch 710 (Fig. 8) which is closed by a cam 712 on the shaft 280 when the shaft is in its rest position. In series with this switch is a switch 714 (Fig. 2) carried by one of the tubes 660. This switch is normally open but is closed by an arm 716 on the bar 682 of the rammer when the rammer is latched in its rearward position. In the event that, because of some malfunctioning of the apparatus, the rammer is not latched in its rearward position the solenoid 400 (Fig. 3) will not be energized by closing the starting switch referred to above. Additional switches (not shown) may be included in the circuit to the solenoid if desired to prevent starting a cycle of operations if other conditions are not satisfied. For example, a switch, operated by the breechblock when in its open position might be included.

Assuming that the various parts are in their proper positions the solenoid 400 will be energized by closing the manual switch engaging the clutch (Figs. 9 and 10) to cause rotation of the cam shaft 280. As soon as the cam shaft starts rotating the solenoid is de-energized by the opening of the circuit thereto at the switch 710. At the beginning of the rotation of the cam shaft 280 the cable 228 (Fig. 32) is operated by a cam 720 (Fig. 8) on the cam shaft to withdraw the shell-holding members (Fig. 31) so that the shell can be moved downwardly by the loading beam. The relationship of the crank arm 284 (Fig. 12), link 286 and toggle links 288 and 290 is such that the initial movement of the cam shaft causes no appreciable movement of the loading beam. As soon as the mechanism shown in Fig. 31 has been released, however, the loading beam starts its downward movement and will continue to move downwardly until the shell carried thereby is in alinement with the bore of the gun. The path of downward movement of the loading beam is controlled by the track 240 (Fig. 18) in accordance with the position of the gun in azimuth and the extent of downward movement is controlled by the position of the slide 304 (Fig. 13) in accordance with the position of the gun in elevation.

At the beginning of the descent of the loading beam the feed segments 480 (Fig. 42) rotate in the direction of the arrows to turn the shell 180°. Operation of the feed segments is effected by the cams 508 on the cam shaft 280 (Fig. 8) operating the cables 506. The desired fuse-setting time will have been determined before the cycle of operations has started and the arm 632 (Fig. 1) set accordingly. The rotation of the shell acts through the chuck 430 (Fig. 33) and gears 436, 582 (Fig. 2) to rotate the shaft 584 and with it the block 588 (Fig. 43). When the shaft has turned an amount corresponding to the position of the arm 636 on the armature of the self-synchronous receiver motor 630, lever 619 is released and spring 600 acts through lever 606, link 580, levers 574, 564 (Fig. 39) to move the arms 526 (Fig. 37) out of locking engagement with the slides 512 whereupon these slides are immediately withdrawn by the springs 522 (Fig. 2) so that the shell will be no longer turned relatively to the fuse ring but the two will turn as a unit. This all takes place during downward movement of the loading beam, so that by the time the beam reaches its lowermost position the fuse has been properly set and the shell is ready to be loaded into the gun and the gun fired. As soon as the loading beam reaches its lowermost position latch 666 (Figs. 1 and 33) is released whereupon the rammer operates to move the shell into the gun. At this time the chuck 430 is withdrawn by operation of the cam 452 (Fig. 8) and the shell supports 402 (Fig. 40) are withdrawn by operation of the cams 426 as heretofore described.

As soon as the shell has been rammed into the gun the loading beam starts to move upwardly back to its initial position, the chuck 430 (Fig. 33) and the shell supports 402 (Fig. 40) being in their inoperative positions during this upward movement. However, they are returned into operative positions as soon as the loading beam reaches its shell-receiving position. During the downward movement of the loading beam the shells are fed from one side or the other of the magazine to deliver another shell into position to be received by the loading beam. This shell feeding is effected by the mechanism illustrated in Figs. 22 to 30 as heretofore described, the cable 124 (Fig. 27) being operated by a cam 730 (Fig. 8) on the cam shaft 280. This shell feeding is completed before the loading beam returns to its upper position and the arms 172, 198 (Fig. 31) are returned to their shell-supporting positions shortly after the loading beam begins its downward movement.

It is important that firing of the gun takes place only after the loading beam has been moved back to its shell-receiving position. Any conventional electrically-operated firing means operated in response to closing of the breechblock may be employed. In the circuit to this means is a switch 732 (Fig. 8) which is normally closed but is opened by a cam 734 during rotation of the cam shaft until the loading beam has been moved upwardly whereupon the cam moves out of engagement with the switch which thereupon returns to closed position and the gun is fired automatically when the breechblock closes.

Having thus described my invention, what I claim as new and desire to secure by Letters Patent of the United States is:

1. In combination, a gun mounted for limited movements in azimuth, a stationary shell magazine mounted rearwardly of said gun, a loading beam pivoted about a horizontal axis extending transversely through the gun for transporting a shell from the magazine into loading position relatively to the gun, means for moving said beam about said axis into and out of a predetermined position relatively to said magazine, and means guiding said loading beam for lateral movement about a vertical axis during movement of the beam out of said predetermined position in accordance with the position of the gun in azimuth thereby properly to aline the shell with the bore of the gun.

2. In combination, a gun mounted for limited movements in azimuth and in elevation, a stationary shell magazine mounted rearwardly of said gun, a loading beam pivoted about a horizontal axis extending transversely through the gun for transporting a shell from the magazine into loading position relatively to the gun, means for moving said beam about said axis into and out of a predetermined position relatively to said magazine, means guiding said loading beam for movement about a vertical axis during movement of the beam out of said predetermined position in accordance with the position of the gun in azimuth, and means controlling the extent of movement of the loading beam away from said magazine in accordance with the position of the gun in elevation thereby properly to aline the shell with the bore of the gun.

3. In combination with a large caliber gun mounted in the nose of an airplane, a magazine in which shells are circularly disposed about the gun, feeding means associated with opposite sides of the magazine, and means for causing alternate operation of said feeding means to feed shells alternately from opposite sides of the magazine to a release station at the top thereof.

4. In combination with a large caliber gun mounted in the nose of an airplane, a magazine in which shells are circularly disposed about the gun, means for feeding shells alternately from opposite sides of the magazine to a release station at the top thereof, means for transporting the shells one at a time from the release station into ramming position, and means for setting the fuses of the shells during their movement by the transporting means.

5. In combination, a gun, a shell magazine mounted rearwardly thereof, a loading beam associated with said gun for carrying shells one at a time from the magazine into alinement with the gun, means carried by the loading beam to rotate the shell a predetermined amount during its movement by the beam, and means operative during a predetermined part of said rotation to lock the fuse ring of the shell against movement therewith.

6. In combination, a gun, a shell magazine mounted rearwardly thereof, a loading beam associated with said gun for carrying the shells one at a time from the magazine into alinement with said gun, means carried by the loading beam to rotate the shell a predetermined amount during its movement by the beam, means for locking the fuse ring of the shell against movement therewith, means for retracting the locking means, and remotely controlled means for adjusting the time in the rotation of the shell when the locking means is retracted.

7. In combination, a gun, means mounting said gun for limited movements about horizontal and vertical axes, a stationary shell magazine located rearwardly of said gun, a loading beam associated with said gun, a supporting frame for said beam, means pivoting said beam on said frame for movements about a horizontal axis passing through said gun, means mounting said frame for pivotal movement about a vertical axis coincident with the vertical axis about which the gun pivots, a guide track connecting the breech end of the gun and the shell magazine, and means connecting the beam to the guide track whereby the beam moves between a fixed position relatively to the magazine and a position in which a shell carried thereby is in alinement with the gun.

8. In combination, a gun, means mounting said gun for limited movements about horizontal and vertical axes, a stationary shell magazine located rearwardly of said gun, a loading beam, a supporting frame for said beam, means pivoting said beam on said frame for movement about a horizontal axis passing transversely through said gun, means mounting said frame for pivotal movement about a vertical axis coincident with the vertical axis about which the gun pivots, a guide track connecting the breech end of the gun and the shell magazine, means connecting the beam to the guide track whereby the beam moves between a fixed position relatively to the magazine and a position in which a shell carried thereby is in alinement with the gun, and means for thus moving the beam, said means including mechanism controlling the downward movement of the beam in accordance with the position of the gun in elevation.

9. In combination, a gun, a loading beam associated with said gun for transporting shells from a fixed position into alinement with the gun, means for supporting a shell in the beam including a rotatable chuck engageable with the back end of the shell, means carried by the beam for turning the shell during movement of the beam, means for locking the fuse ring of the shell against movement therewith during a portion of said rotation, means for withdrawing said locking means, and means operated by said chuck for rendering said withdrawing means effective.

10. In combination, a gun, a loading beam associated with said gun for transporting shells from a fixed position into alinement with the gun, means for supporting a shell in the beam including a rotatable chuck engageable with the back end of the shell, means carried by the beam for turning the shell during movement of the beam, means for locking the fuse ring of the shell against movement therewith during a portion of said rotation, means for withdrawing said locking means, means operated by said chuck for rendering said withdrawing means effective, and means for varying the time in the rotation of the chuck when the withdrawing means becomes effective.

11. Mechanism for setting the fuses of shells comprising means for supporting a shell for rotation, said means including a rotatable chuck engageable with the rear end of a shell, means for rotating the shell, means for locking the fuse ring of the shell against rotation during a predetermined portion of the movement of the shell, and means controlled by said chuck during rotation of said shell for releasing said locking means at a predetermined time in the rotation of the shell.

12. Mechanism for setting the fuses of shells comprising means for supporting a shell for rotation, said means including a rotatable chuck engageable with the rear end of a shell, means for rotating the shell, means for locking the fuse ring of the shell against rotation during a predetermined portion of the movement of the shell, means controlled by said chuck during rotation of said shell for releasing said locking means at a predetermined time in the rotation of the shell, and remotely controlled means for varying the time in the rotation of the shell when said chuck controlled means becomes effective.

13. A shell magazine of semi-circular formation having means for guiding shells from each side thereof to a release station at the top, supporting means engageable with the lowermost shell in each side of the magazine for sustaining the weight of the shells in the respective sides, and means for alternately moving said supporting means upwardly in increments sufficient to move the shells at opposite sides of the magazine one at a time to the top thereof.

14. A shell magazine of semi-circular formation having means for guiding shells from each side thereof to a release station at the top, supporting means engageable with the lowermost shell in each side of the magazine for sustaining the weight of the shells in the respective sides, means urging each of said supporting means upwardly, means guiding said supporting means in their upward movements, locking means associated with each supporting means cooperating with its respective guiding means for limiting each movement of the supporting means to a distance just sufficient to bring a shell into a release station at the top of the magazine, and means for alternately releasing the locking means at opposite sides of the magazine.

15. In combination, a gun, a shell magazine of semi-circular formation located rearwardly of said gun, said magazine having means for guiding the shells from each side thereof to a release station at the top, a loading beam associated with said gun for transporting shells from said release station one at a time into alinement with the gun, means for ramming the shell into the gun, supporting means engageable with the lowermost shell in each side of the magazine for sustaining the weight of the shells in the respective sides, means urging said supporting means upwardly, means guiding said supporting means in their upward movements, locking means associated with each supporting means cooperating with its respective guiding means for limiting each movement of the supporting means to a distance just sufficient to bring a shell into the release station at the top of the magazine, means for operating said loading beam, and means operated automatically upon each movement of the loading beam to move a shell out of the release station, for releasing the locking means first at one side of the magazine and during the next movement of the loading beam for releasing the locking means at the other side of the magazine.

PAUL H. DIXON.

REFERENCES CITED

The following references are of record in the file of this patent:

UNITED STATES PATENTS

| Number | Name | Date |
| --- | --- | --- |
| 1,664,676 | Goetzenberger | Apr. 3, 1928 |
| 1,750,724 | Methlin | Mar. 18, 1930 |
| 2,252,227 | Haberlin | Aug. 12, 1941 |
| 2,401,654 | Molins et al. | June 4, 1946 |
| 2,417,300 | Greene | Mar. 11, 1947 |
| 2,439,142 | Molins | Apr. 6, 1948 |
| 2,447,092 | Ray | Aug. 17, 1948 |
| 2,451,764 | Molins et al. | Oct. 19, 1948 |
| 2,460,384 | Haas | Feb. 1, 1949 |
| 2,499,271 | Harvey et al. | Feb. 28, 1950 |